(12) United States Patent
Matsunaga et al.

(10) Patent No.: US 12,206,207 B2
(45) Date of Patent: Jan. 21, 2025

(54) POWER TRANSMISSION DEVICE AND ELECTRIC POWER DEVICE

(71) Applicant: HONDA MOTOR CO., LTD., Tokyo (JP)

(72) Inventors: Atsushi Matsunaga, Wako (JP); Toshiya Seki, Wako (JP); Junji Yasuda, Wako (JP); Tsutomu Takahashi, Wako (JP); Takashi Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 575 days.

(21) Appl. No.: 17/612,243

(22) PCT Filed: May 21, 2020

(86) PCT No.: PCT/JP2020/020038
§ 371 (c)(1),
(2) Date: Nov. 18, 2021

(87) PCT Pub. No.: WO2020/235618
PCT Pub. Date: Nov. 26, 2020

(65) Prior Publication Data
US 2022/0224047 A1 Jul. 14, 2022

(30) Foreign Application Priority Data
May 21, 2019 (JP) ................................. 2019-095586

(51) Int. Cl.
*H02J 7/00* (2006.01)
*F16H 21/44* (2006.01)
(Continued)

(52) U.S. Cl.
CPC ....... *H01R 13/62933* (2013.01); *F16H 21/44* (2013.01); *H01M 10/46* (2013.01); *H02J 7/0045* (2013.01); *H02J 7/0042* (2013.01)

(58) Field of Classification Search
CPC .. H01R 13/62933; F16H 21/44; H02J 7/0045; H02J 7/0042; H01M 10/46
(Continued)

(56) References Cited

U.S. PATENT DOCUMENTS 5,636,275 A * 6/1997 Takagi ................ H04M 1/0216
379/434
2018/0169851 A1 6/2018 Radovich et al.
2019/0393627 A1 12/2019 Etsunagi et al.

FOREIGN PATENT DOCUMENTS

CN 107672654 2/2018
CN 108346982 7/2018
(Continued)

OTHER PUBLICATIONS

Chinese Office Action for Chinese Patent Application No. 202080037441.2 dated Apr. 10, 2024.
(Continued)

*Primary Examiner* — Zixuan Zhou
(74) *Attorney, Agent, or Firm* — Amin, Turocy & Watson, LLP

(57) ABSTRACT

Provided is a power transmission device with which it is possible to minimize transmission of an excessive external force. This power transmission device has an input lever, an output lever, and a housing that are capable of moving relative to each other and that are mechanically connected to each other so as to be capable of transmitting power therebetween. The power transmission device has: a main spring disposed on a first power transmission path that is for transmitting power between the input lever and the output lever; a return spring disposed on a second power transmis-
(Continued)

sion path that is for transmitting power between the input lever and the housing; and a damper disposed on a third power transmission path that is for transmitting power between the output lever and the housing.

21 Claims, 32 Drawing Sheets

(51) Int. Cl.
    *H01M 10/46*    (2006.01)
    *H01R 13/629*   (2006.01)
(58) Field of Classification Search
    USPC .......................................................... 320/107
    See application file for complete search history.

(56) References Cited

FOREIGN PATENT DOCUMENTS

| | | |
|---|---|---|
| EP | 06-013352 | 2/1994 |
| JP | 06-013352 | 2/1994 |
| JP | 08-331219 | 12/1996 |
| JP | 2003-009409 | 1/2003 |
| JP | 2012-206559 | 10/2012 |
| JP | 2013-063054 | 4/2013 |
| JP | 2016-160734 | 9/2016 |
| JP | 6286084 | 2/2018 |
| JP | 2019-068552 | 4/2019 |
| WO | 2019/064563 | 4/2019 |

OTHER PUBLICATIONS

International Search Report and Written Opinion for International Application No. PCT/JP2020/020038 mailed on Aug. 25, 2020, 9 pages.
Extended European Search Report for European Patent Application No. 20810054.5 dated Jul. 7, 2022.
European Office Action for European Patent Application No. 20810054.5 dated Feb. 21, 2023.
Japanese Office Action for Japanese Patent Application No. 2021-520834 dated May 7, 2024.

\* cited by examiner

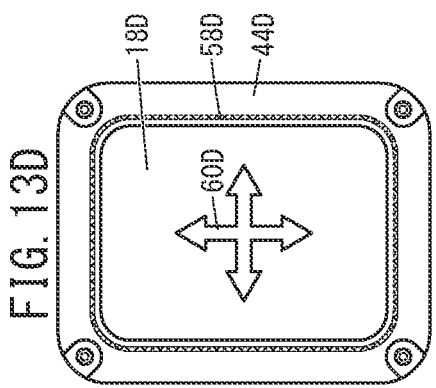
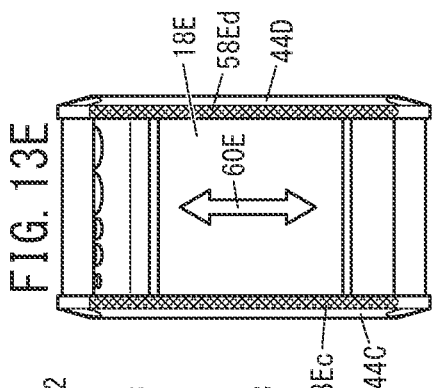
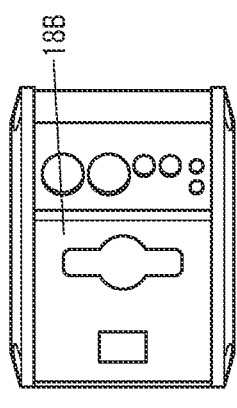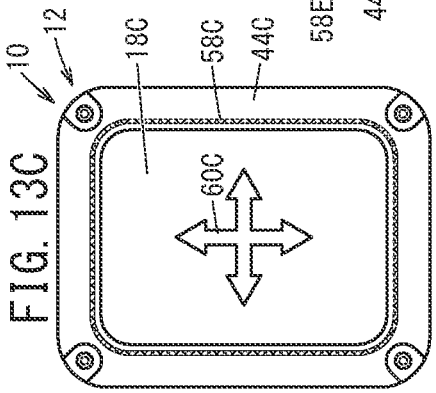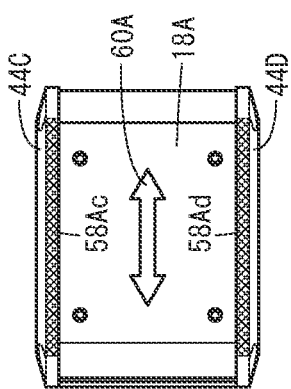
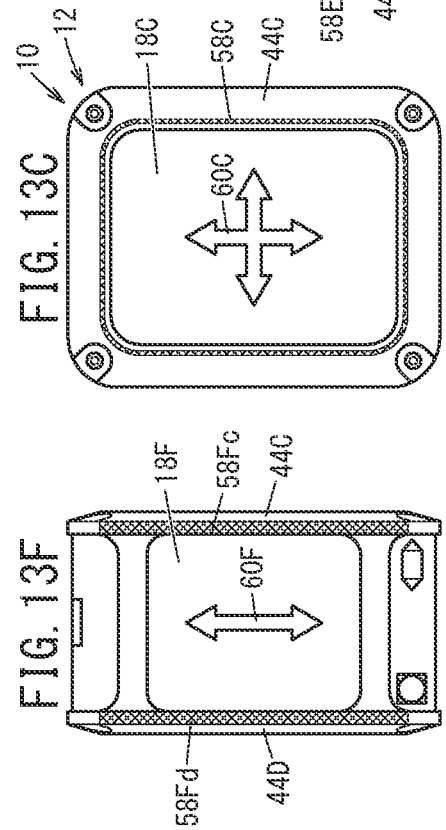

LARGE DAMPING FORCE

GRADUAL DECREASE IN DAMPING FORCE

NO DAMPING FORCE

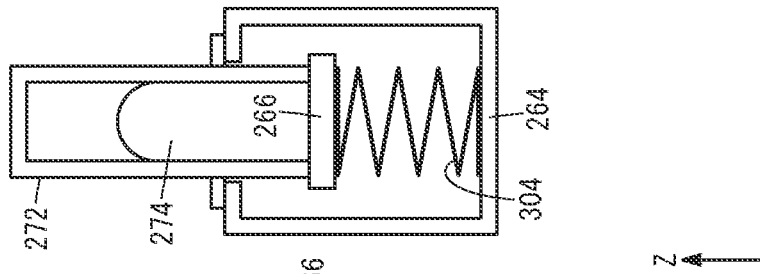
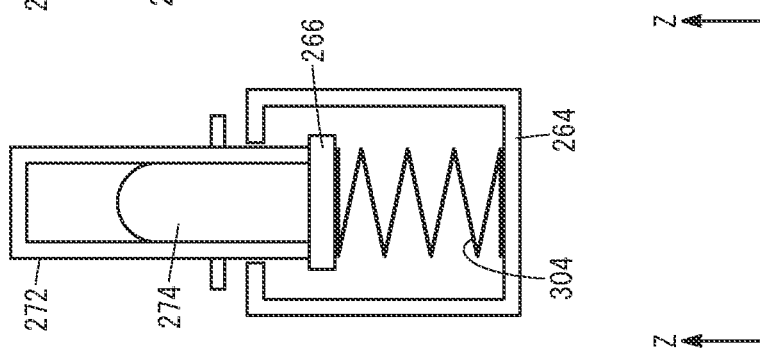
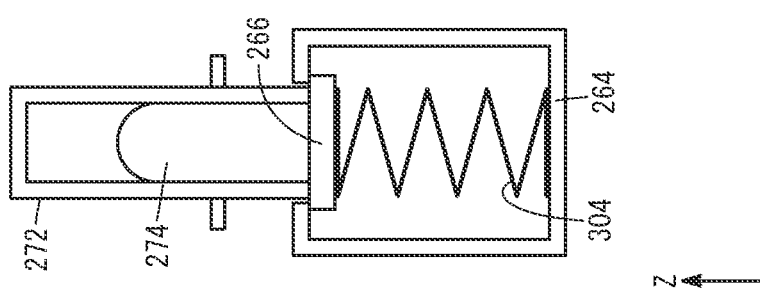
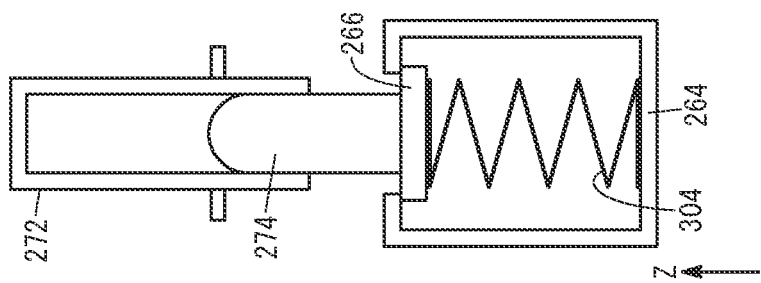
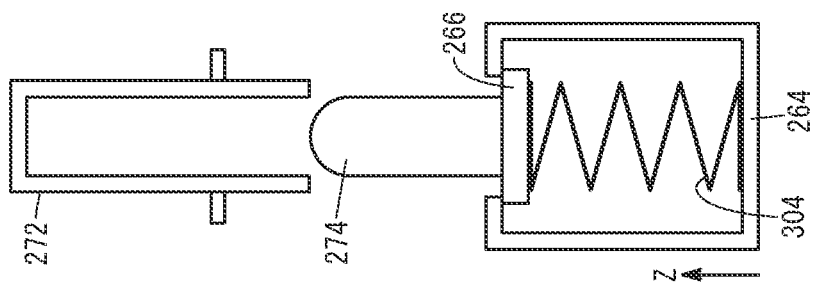

POWER TRANSMISSION DEVICE AND ELECTRIC POWER DEVICE

TECHNICAL FIELD

The present invention relates to a motive power transmission device that transmits motive power and an electric power device in which the motive power transmission device is disposed.

BACKGROUND ART

JP 6286084 B1 discloses that a connector of a mobile battery and a connector of a connector holder in a housing are connected to each other.

JP 2019-068552 A discloses a structure in which a charging plug in a containment chamber is inserted into a plug outlet of a rechargeable battery.

SUMMARY OF INVENTION

In the techniques disclosed in JP 6286084 B1 and JP 2019-068552 A, when an unexpected high-speed battery motion occurs, excessive external force may be applied to a connector or a charging plug.

The present invention has been devised in order to solve the problems discussed above, and has the object of providing a motive power transmission device and an electric power device that can suppress transmission of excessive external force.

A motive power transmission device according to a first aspect of the present invention includes a first member, a second member, and a third member that are movable relatively to each other and mechanically connected so as to transmit motive power to each other, and the motive power transmission device includes a first elastic member disposed on a first motive power transmission path that is a motive power transmission path between the first member and the second member, a second elastic member disposed on a second motive power transmission path that is a motive power transmission path between the first member and the third member, and a buffer member disposed on a third motive power transmission path that is a motive power transmission path between the second member and the third member.

In an electric power device according to a second aspect of the present invention, a motive power transmission device having a first member, a second member, and a third member that are movable relatively to each other and mechanically connected so as to transmit motive power to each other, is arranged, and the electric power device includes a first elastic member disposed on a first motive power transmission path that is a motive power transmission path between the first member and the second member, a second elastic member disposed on a second motive power transmission path that is a motive power transmission path between the first member and the third member, and a buffer member disposed on a third motive power transmission path that is a motive power transmission path between the second member and the third member, wherein the first member includes an input portion to which a force is input from outside of the motive power transmission device, and the second member includes an output portion configured to output a force to the outside of the motive power transmission device.

The input portion is disposed in a manner that the force is input from an electric energy storage device which is attachable to and detachable from the electric power device, and the output portion is disposed in a manner that the force is output to a terminal of the electric power device which is connected to a terminal of the electric energy storage device.

According to the present invention, it is possible to suppress transmission of excessive external force.

BRIEF DESCRIPTION OF DRAWINGS

FIGS. 13A, 13B, 13C, 13D, 13E and 13F show six orthogonal views of the charging power supply device according to an embodiment;

FIGS. 32A, 32B, 32C, 32D and 32E are dynamic equivalent models of the connector unit.

DESCRIPTION OF THE INVENTION

Preferred embodiments of a motive power transmission device according to the present invention will be described in detail below with reference to the accompanying drawings.

Embodiment

Figure 1:
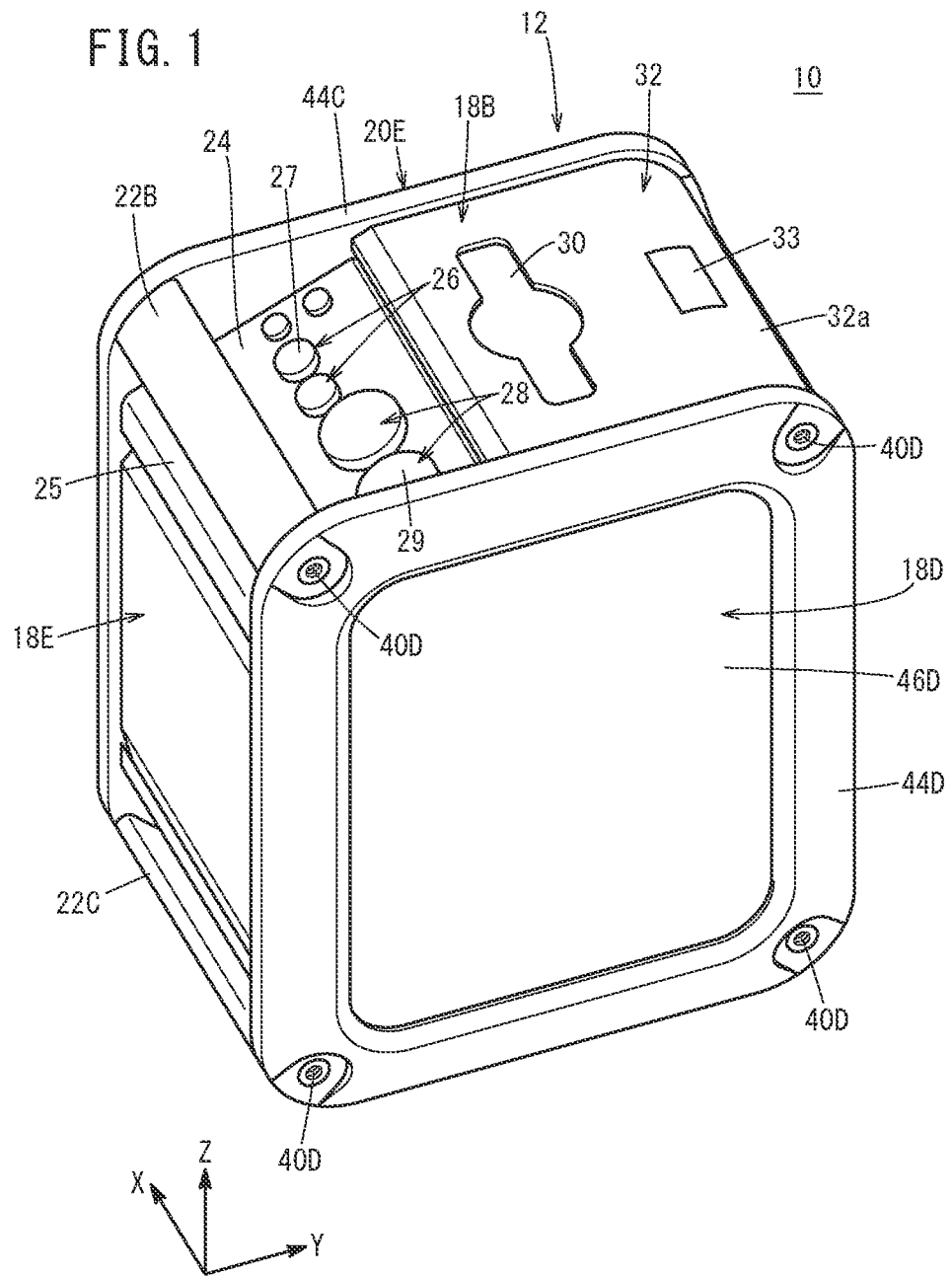
FIG. 1 is a perspective view of a charging power supply device according to an embodiment.

A charging power supply device according to one embodiment will be described using drawings. FIG. 1 is a perspective view of the charging power supply device according to an embodiment.

As shown in FIG. 1, a charging power supply device 10 includes a casing 12. The shape of the casing 12 is substantially polyhedral. More specifically, the shape of the casing 12 is substantially a rectangular parallelepiped. As shown in FIG. 1, each vertex and each edge of the casing 12 are filleted. That is, each vertex and each edge of the casing 12 is made to have a rounded shape. The charging power supply device 10 corresponds to a power device of the present invention.

Figure 2:
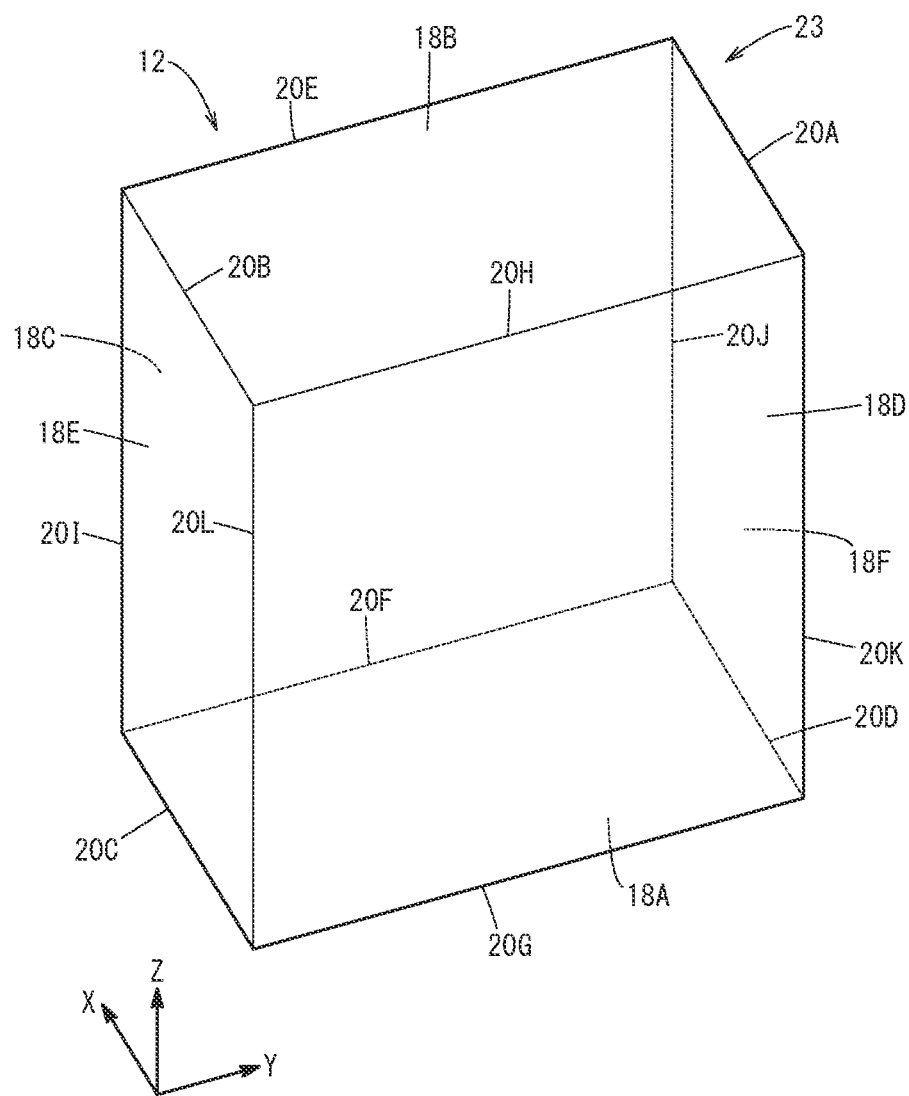
FIG. 2 shows a model of a rectangular parallelepiped corresponding to a casing of the charging power supply device according to an embodiment.

FIG. 2 shows a model of a rectangular parallelepiped corresponding to a casing of the charging power supply device according to the present embodiment. As shown in FIG. 2, a rectangular parallelepiped 23 corresponding to the casing 12 includes a bottom surface (floor surface) 18A, a top surface 18B, a left-side surface (side surface) 18C, a right-side surface (side surface) 18D, a front surface (front-side surface, side surface) 18E, and a rear surface (rear-side surface, side surface) 18F. The reference numeral 18 is used when describing a surface in general, and the reference numerals 18A to 18F are used when describing each individual surface.

The left-side surface 18C, the right-side surface 18D, the front surface 18E, and the rear surface 18F are bent from and continuous with the bottom surface 18A. Furthermore, the left-side surface 18C, the right-side surface 18D, the front surface 18E, and the rear surface 18F are bent from and continuous with the top surface 18B. The bottom surface 18A and the top surface 18B are aligned with each other. That is, the bottom surface 18A and the top surface 18B are parallel to each other. In other words, the normal direction of the bottom surface 18A and the normal direction of the top surface 18B are aligned with each other. The left-side surface 18C and the right-side surface 18D are aligned with each other. In other words, the normal direction of the left-side surface 18C and the normal direction of the right-side surface 18D are aligned with each other. The front surface 18E and the rear surface 18F are aligned with each other. In other words, the normal direction of the front surface 18E and the normal direction of the rear surface 18F are aligned with each other.

The direction from the left-side surface 18C toward the right-side surface 18D or the direction from the right-side surface 18D to the left-side surface 18C is a width direction (X direction). The direction from the front surface 18E toward the rear surface 18F or the direction from the rear surface 18F toward the front surface 18E is a depth direction (Y direction). The direction from the bottom surface 18A toward the top surface 18B or the direction from the top surface 18B toward the bottom surface 18A is a height direction (Z direction).

The rectangular parallelepiped 23 corresponding to the casing 12 has twelve edges 20A to 20L. The edge 20A is positioned at the region (portion, location) where the top surface 18B and the rear surface 18F intersect. The edge 20B is positioned at the region where the top surface 18B and the front surface 18E intersect. The edge 20C is positioned at the region where the bottom surface 18A and the front surface 18E intersect. The edge 20D is positioned at the region where the bottom surface 18A and the rear surface 18F intersect. The edges 20A to 20D are aligned with each other.

The edge 20E is positioned at the region where the top surface 18B and the left-side surface 18C intersect. The edge 20F is positioned at the region where the bottom surface 18A and the left-side surface 18C intersect. The edge 20G is positioned at the region where the bottom surface 18A and the right-side surface 18D intersect. The edge 20H is positioned at the region where the right-side surface 18D and the top surface 18B intersect. The edges 20E to 20H are aligned with each other.

The edge 20I is positioned at the region where the front surface 18E and the left-side surface 18C intersect. The edge 20J is positioned at the region where the left-side surface 18C and the rear surface 18F intersect. The edge 20K is positioned at the region where the rear surface 18F and the right-side surface 18D intersect. The edge 20L is positioned at the region where the front surface 18E and the right-side surface 18D intersect. The edges 20I to 20L are aligned with each other.

Figure 3:
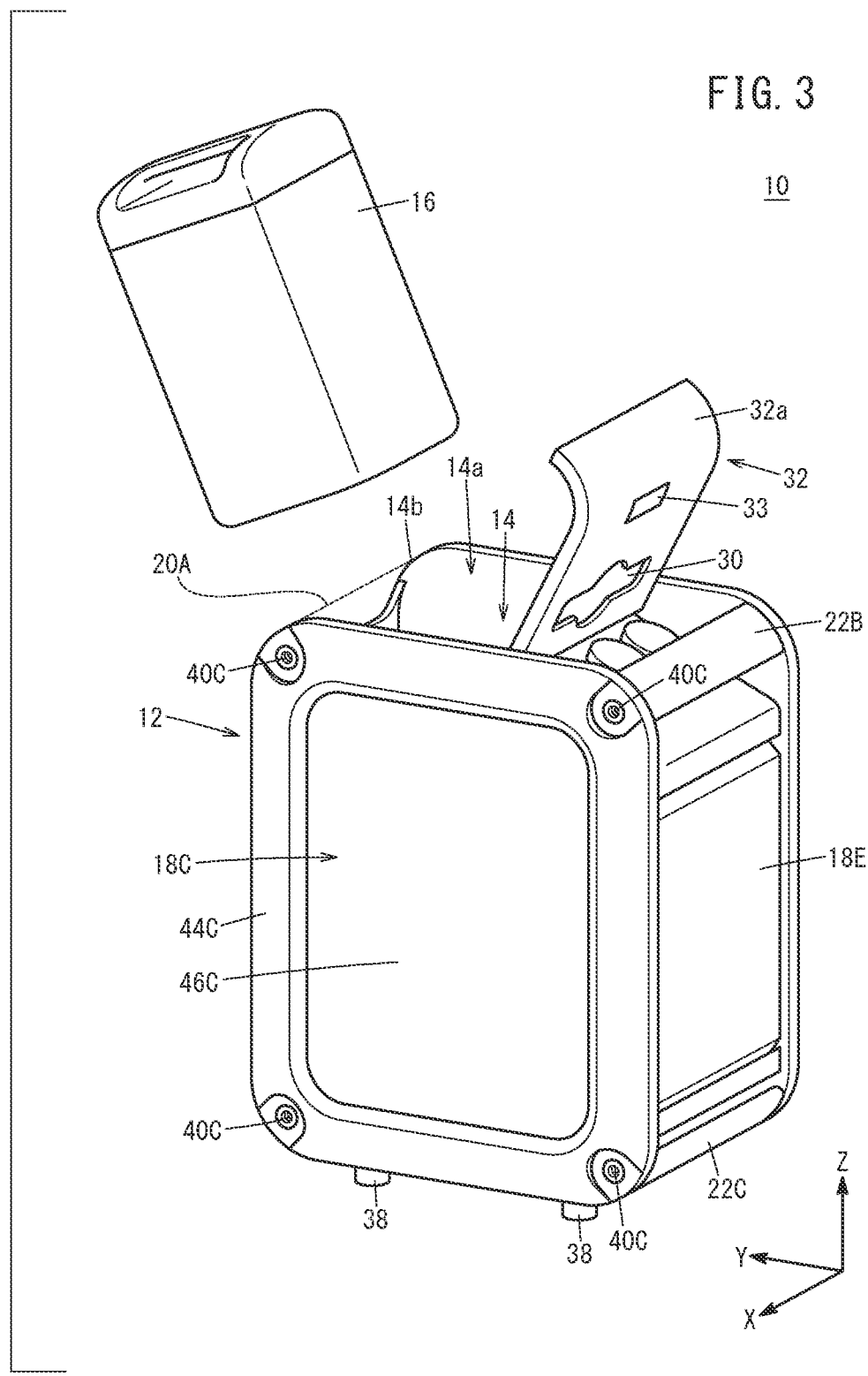
FIG. 3 is a perspective view of the charging power supply device according to an embodiment.

FIG. 3 is a perspective view of the charging power supply device according to the present embodiment. As shown in FIG. 3, the casing 12 includes a containment chamber 14 (containment portion). A battery (contained item) 16 can be contained inside the containment chamber 14. The battery 16 can be inserted into and removed from the containment chamber 14. The battery 16 corresponds to an electric energy storage device of the present invention.

As shown in FIGS. 1 and 3, a cover portion (covering member, cover) 32 that covers an opening 14a continuous with the containment chamber 14 is included on the top portion of the casing 12. The cover portion 32 includes an open button 33. When the open button 33 is pressed by a user, the cover portion 32 opens. FIG. 1 shows a state in which the cover portion 32 is closed. FIG. 3 shows a state in which the cover portion 32 is open. As shown in FIG. 1, the cover portion 32 includes an indicator 30 that indicates the remaining amount of the battery 16. The cover portion 32 is capable of pivoting on a pivoting shaft 31 (see FIG. 8) provided to the top surface 18B. This pivoting shaft 31 is provided on the side of a recessed portion 24 described further below. By having the cover portion 32 pivot on the pivoting shaft 31, the containment chamber 14 can be opened and closed. As shown in FIG. 3, when the cover portion 32 is open, the user can insert and remove the battery 16 into and from the containment chamber 14. As shown in FIG. 1, when the cover portion 32 is closed, one end of the cover portion 32 is near the top end of the rear surface 18F. In other words, when the cover portion 32 is closed, the one end of the cover portion 32 is positioned near the location corresponding to the edge 20A. The cover portion 32 includes a curved portion 32a. When the cover portion 32 is closed, the curved portion 32*a* is positioned at a location corresponding to the edge 20A.

As shown in FIG. 2, the edge 20A is positioned at one side of the rear surface 18F, namely the top side. In other words, the edge 20A is positioned at one side of the top surface 18B, namely the rear side. As shown in FIGS. 2 and 3, the opening 14*a* continuous with the containment chamber 14, or a peripheral edge portion 14*b* of the opening 14*a* continuous with the containment chamber 14, is positioned at the location corresponding to the edge 20A.

As shown in FIG. 2, the edge 20B is positioned at one side of the front surface 18E, namely the top side. In other words, the edge 20B is positioned at the other side of the top surface 18B, namely the front side. As described above, the edge 20B is aligned with the edge 20A. As shown in FIG. 1, a handle portion (first handle portion, gripping portion, bar, support portion, or grip) 22B is included at the region corresponding to the edge 20B. The handle portion 22B extends in the width direction, i.e., the X direction.

As shown in FIG. 2, the edge 20C is positioned at the other side of the front surface 18E, namely the bottom side. In other words, the edge 20C is positioned at the one side of the bottom surface 18A, namely the front side. As described above, the edge 20C is aligned with the edge 20A. As shown in FIG. 1, a handle portion (second handle portion, gripping portion, bar, support portion, or grip) 22C is included at the region corresponding to the edge 20C. The handle portion 22C extends in the width direction, i.e., the X direction.

Figure 4:
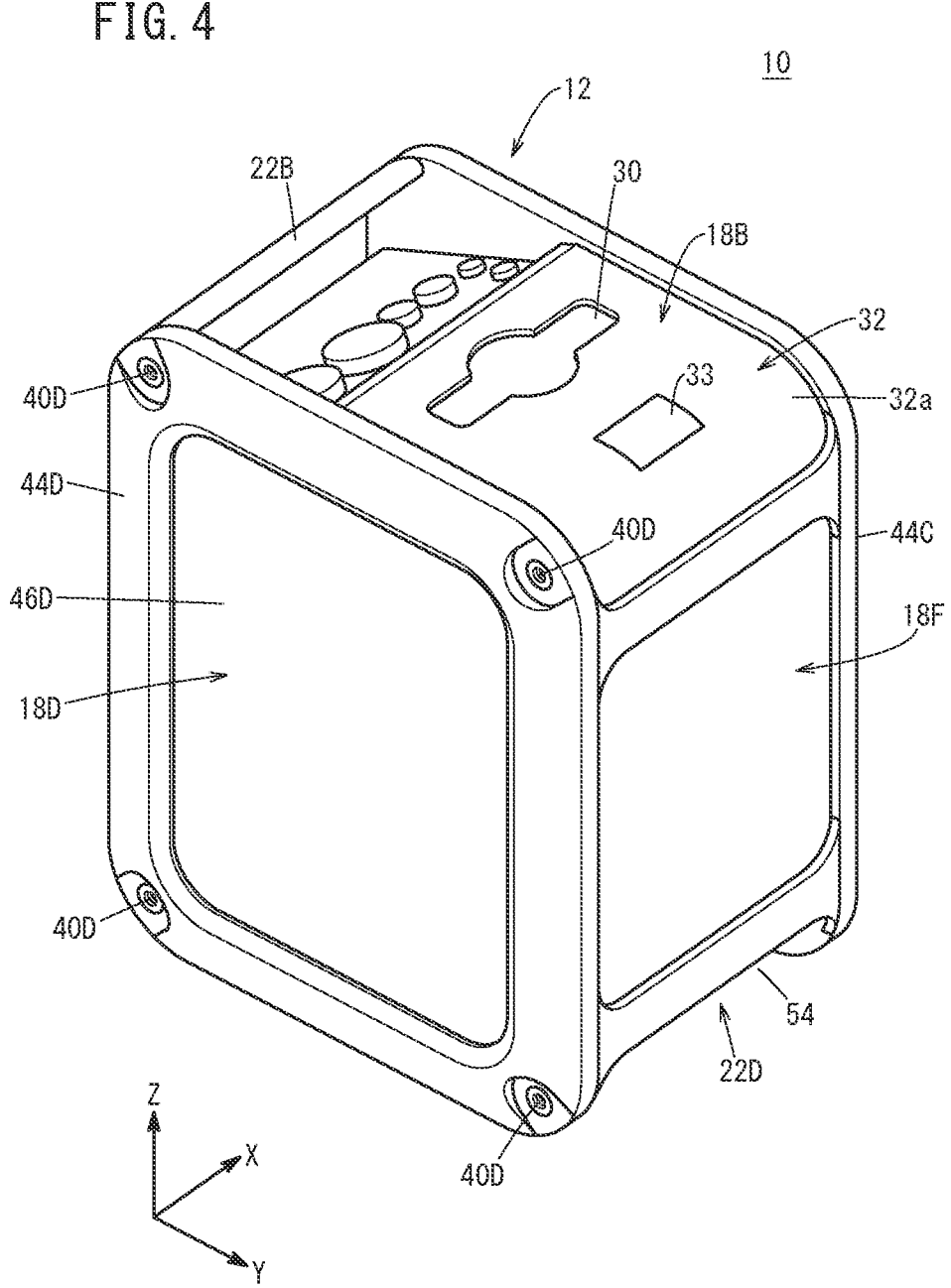
FIG. 4 is a perspective view of the charging power supply device according to an embodiment.
Figure 7:
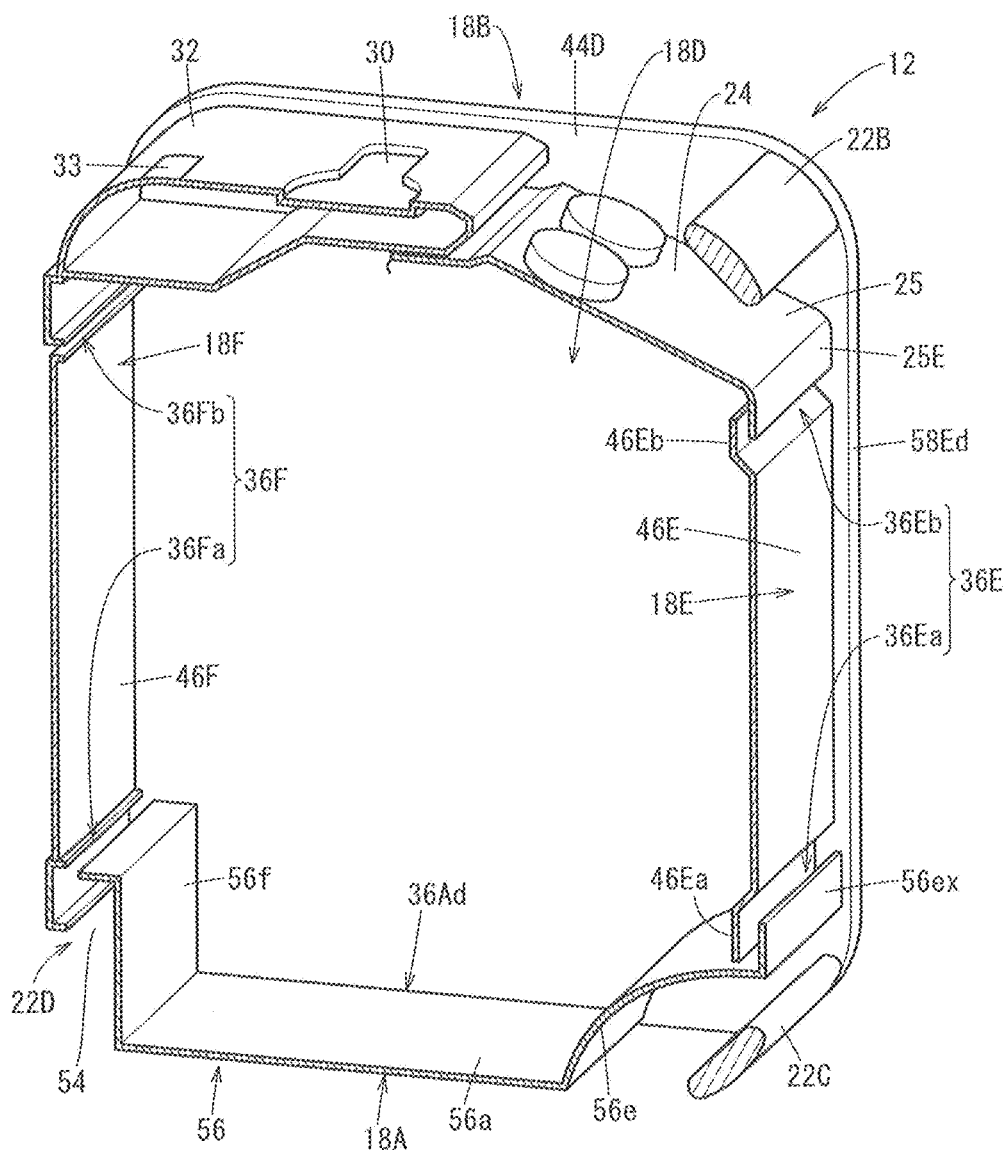
FIG. 7 is a cross-sectional perspective view of the charging power supply device according to an embodiment.

The edge 20D is positioned at the other side of the rear surface 18F, namely the bottom side. In other words, the edge 20D is positioned at the other side of the bottom surface 18A, namely the rear side. As described above, the edge 20D is aligned with the edge 20A. FIG. 4 is a perspective view of the charging power supply device according to the present embodiment. As shown in FIG. 4, a handle portion (third handle portion, support portion, holding portion, or recessed portion) 22D is included at the region corresponding to the edge 20D. The handle portion 22D extends in the width direction, i.e., the X direction, and is depressed toward the front surface 18E side. In other words, the handle portion 22D is formed by forming a recessed space 54 (see FIG. 4) that is recessed toward the top surface 18B side in the casing 12. The recessed space 54 is defined by a portion 56*f* (see FIG. 7) described further below. As shown in FIG. 7, the top part of this portion 56*f* is bent toward the rear surface 18F side. The part of this portion 56*f* that is bent toward the rear surface 18F side is positioned on the top surface 18B side of the bottom end region of the handle portion 22D. The reference numeral 22 is used when describing a handle portion in general, and the reference numerals 22B to 22D are used when describing each individual handle portion.

As shown in FIG. 1, the recessed portion 24, which has a shape formed by cutting away a part of the top surface 18B and the front surface 18E, is formed near the region corresponding to the edge 20B. The floor portion of the recessed portion 24 is defined by a member 25, one side portion of the recessed portion 24 is formed by part of an outer marginal member 44C described further below, and the other side portion of the recessed portion 24 is formed by part of an outer marginal member 44D described further below. The surface of the member 25 forming the floor portion of the recessed portion 24 is inclined relative to the top surface 18B. Since the recessed portion 24 is formed in this way, the handle portion 22B can be included at the location corresponding to the edge 20B. The member 25 forming the floor portion of the recessed portion 24 includes a USB power output terminal (output terminal or connector) 26 and an AC power output terminal (output terminal or connector) 28. The USB power output terminal 26 and the AC power output terminal 28 are for supplying power from the charging power supply device 10 to an external device. The USB power output terminal 26 can output DC power. The USB power output terminal 26 is, for example, a USB terminal to which a USB cable can be connected. That is, The USB power output terminal 26 is an outlet to which a USB cable can be connected. A load that receives DC power can be connected to the USB power output terminal 26. The AC power output terminal 28 can output AC power. The AC power output terminal 28 is an outlet to which a commercial power supply plug can be connected, for example. A load that receives AC power can be connected to the AC power output terminal 28. Here, an example is described of a case where two USB power output terminals 26 and two AC power output terminals 28 are included, but the number of USB power output terminals 26 and the number of AC power output terminals 28 are not limited to this. FIG. 1 shows a state in which caps 27 and 29 respectively cover the USB power output terminal 26 and the AC power output terminal 28. The caps 27 and 29 are for protecting the USB power output terminal 26 and the AC power output terminal 28, respectively.

Figure 5:
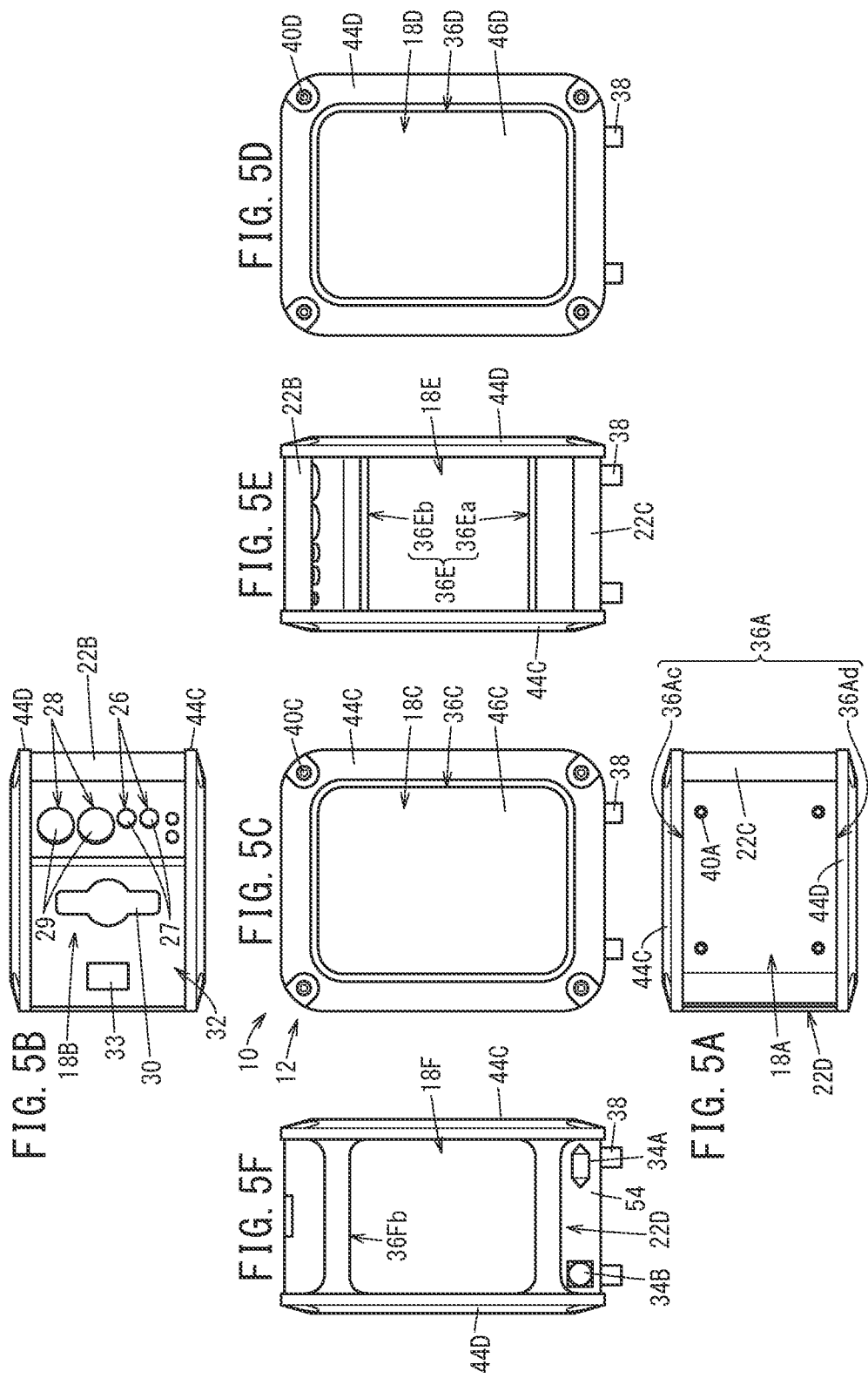
FIGS. 5A, 5B, 5C, 5D, 5E and 5F are six orthogonal views of the charging power supply device according to an embodiment.

FIGS. 5A to 5F are six orthogonal views of the charging power supply device according to the present embodiment. FIG. 5A is a bottom view, FIG. 5B is a top view, FIG. 5C is a left side view, FIG. 5D is a right side view, FIG. 5E is a front view, and FIG. 5F is a rear view. FIGS. 5C, 5D, 5E, and 5F show grounding protrusions 38 that are described further below, but these grounding protrusions 38 are omitted from FIG. 5A.

As shown in FIG. 5F, an AC power input terminal (input terminal or connector) 34A and a DC power input terminal (input terminal or connector) 34B are included in the recessed space 54. The AC power input terminal 34A and the DC power input terminal 34B are for supplying power to the charging power supply device 10. The AC power input terminal 34A is a socket to which a power supply cable (not shown in the drawings) can be connected. The power supply cable is connected to the AC power input terminal 34A for inputting power supplied from a commercial AC power supply to the charging power supply device 10. The DC power input terminal 34B is a socket to which a power supply cable (not shown in the drawings) can be connected. The power supply cable is connected to the DC power input terminal 34B for inputting DC power to the charging power supply device 10.

Figure 6:
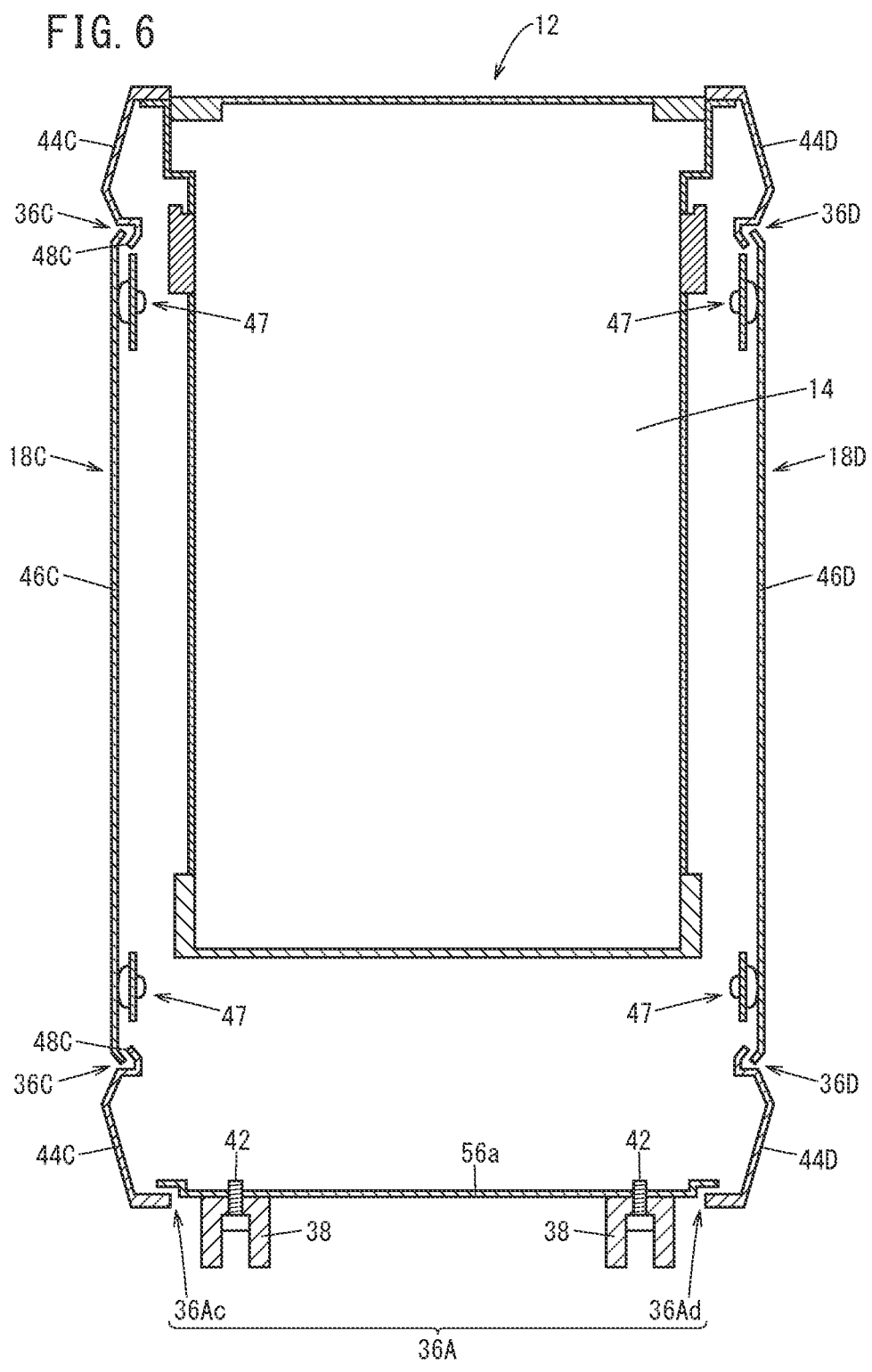
FIG. 6 is a cross-sectional view of the charging power supply device according to an embodiment.

As shown in FIG. 5A, screw holes 40A for attaching the grounding protrusions 38 (see FIG. 3) are included in the bottom surface 18A of the casing 12. FIG. 6 is a cross-sectional view of the charging power supply device according to the present embodiment. As shown in FIG. 6, the grounding protrusions 38 can be attached to the bottom surface 18A of the casing 12 by using screws 42. When the casing 12 is set to the upright position in a state where the grounding protrusions 38 are attached to the bottom surface 18A, the grounding protrusions 38 enter a state of protruding toward the floor (floor surface, loading surface, or installation surface). As shown in FIG. 5C, screw holes 40C for attaching the grounding protrusions 38 are included at the four corners of the outer marginal member 44C, described further below. Furthermore, as shown in FIG. 5D, screw holes 40D for attaching the grounding protrusions 38 are included at the four corners of the outer marginal member 44D, described further below. It is also possible to remove the grounding protrusions 38 from the bottom surface 18A of the casing 12 and attach the grounding protrusions 38 to the four corners of the outer marginal member 44C or the four corners of the outer marginal member 44D.

As shown in FIGS. 5A and 6, a ventilation path (ventilation port, intake port, intake path, or gap) 36A is included in the bottom surface 18A. The ventilation path 36A is formed by a partial ventilation path 36Ac and a partial ventilation path 36Ad. As shown in FIGS. 5C and 6, a ventilation path (ventilation port, intake port, intake path, or gap) 36C is included in the left-side surface 18C. As shown in FIGS. 5D and 6, a ventilation path (ventilation port, intake port, intake path, or gap) 36D is included in the right-side surface 18D.

Figure 8:
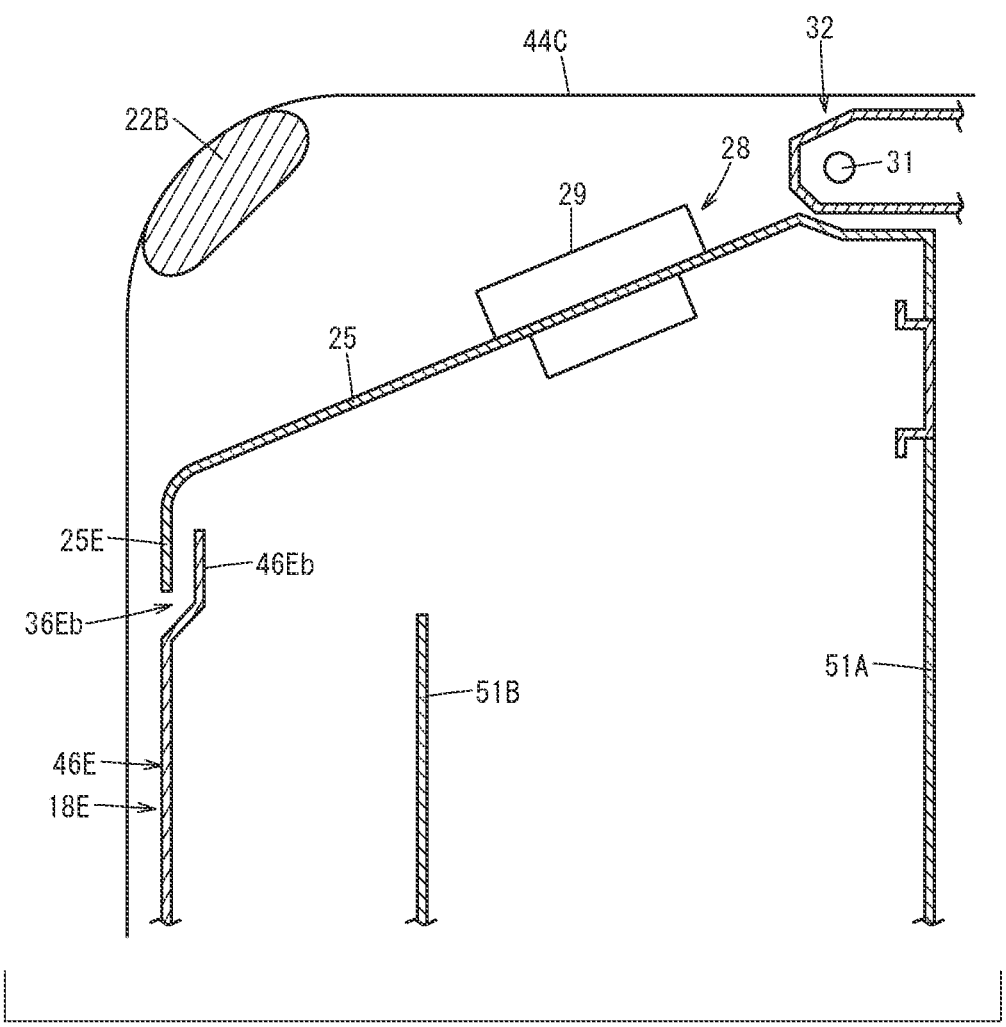
FIG. 8 is a cross-sectional view of a portion of the charging power supply device according to an embodiment.
Figure 9:
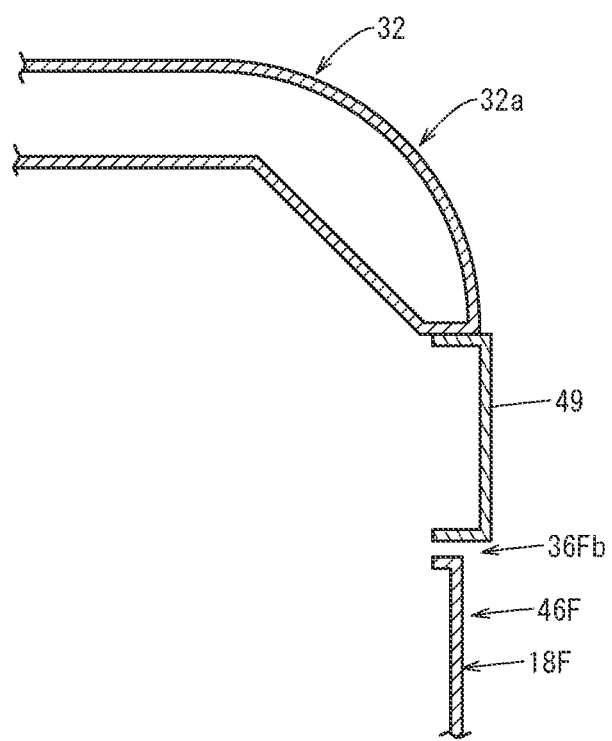
FIG. 9 is a cross-sectional view of a portion of the charging power supply device according to an embodiment.

FIG. 7 is a cross-sectional perspective view of the charging power supply device according to the present embodiment. In FIG. 7, a slit 59 (see FIG. 10) described further below and an opening 57d (see FIG. 10) described further below are omitted from the drawing. FIG. 8 is a cross-sectional view of a portion of the charging power supply device according to the present embodiment. FIG. 8 shows a cross section on the front surface 18E side. FIG. 9 is a cross-sectional view of a portion of the charging power supply device according to the present embodiment. FIG. 9 shows a cross section on the rear surface 18F side. As shown in FIG. 7, a ventilation path (ventilation port, exhaust port, exhaust path, or gap) 36E is included in the front surface 18E. The ventilation path 36E is formed by a partial ventilation path 36Ea and a partial ventilation path 36Eb. As shown in FIG. 7, a ventilation path (ventilation port, intake port, intake path, or gap) 36F is included in the rear surface 18F. The ventilation path 36F is formed by a partial ventilation path 36Fa and a partial ventilation path 36Fb. The reference numeral 36 is used when describing a ventilation path in general, and the reference numerals 36A, 36C, 36D, 36E, and 36F are used when describing each individual ventilation path. According to the present embodiment, the ventilation paths 36A, 36C, 36D, 36E, and 36F are included in the bottom surface 18A, the left-side surface 18C, the right-side surface 18D, the front surface 18E, and the rear surface 18F. Therefore, by using a blower 52 described further below to blow air, it is possible to bring air into the casing 12 via the ventilation paths 36A, 36C, 36D, and 36F, for example, and to expel the air from inside the casing 12 via the ventilation path 36E, for example. Therefore, according to the present embodiment, it is possible to favorably cool the inside of the casing 12.

Figure 10:
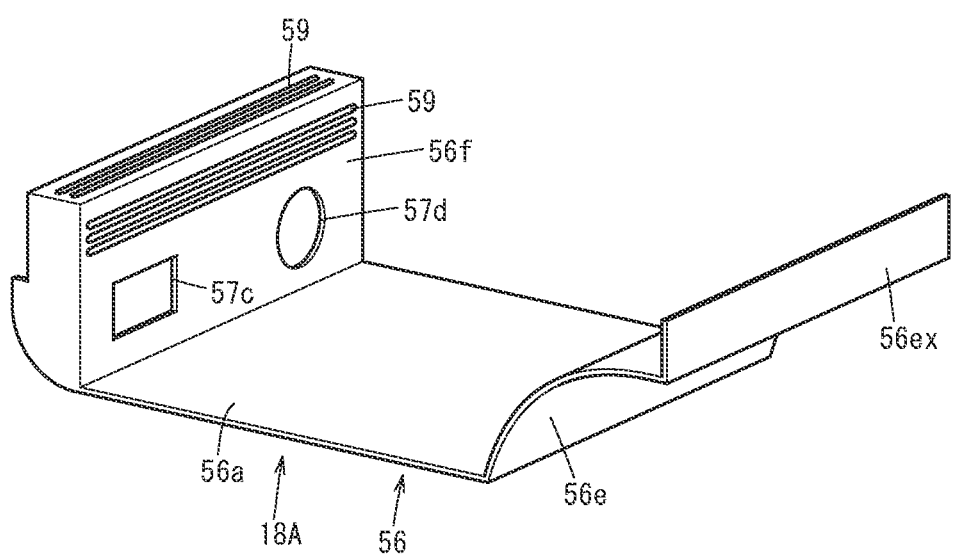
FIG. 10 shows members included on the bottom surface side of the casing.

FIG. 10 shows members included on the bottom surface side of the casing. A member 56 is included on the bottom surface 18A side of the casing 12. The member 56 includes a board-shaped portion 56a corresponding to the bottom surface 18A. The portion 56f bent from and continuous with this portion 56a is included at one side of the portion 56a, namely the rear surface 18F side. A portion 56e bent from and continuous with this portion 56a is included at the other side of the portion 56a, namely the front surface 18E side. The portion 56f is positioned on the rear surface 18F side, and the portion 56e is positioned on the front surface 18E side. The portion 56f includes an opening 57c, to which the AC power input terminal 34A is attached, and the opening 57d, to which the DC power input terminal 34B is attached. A plurality of slits 59 are formed in the portion 56f. Air can flow between the inside and outside of the casing 12 through the slit 59. Here, an example is shown of a case where five slits 59 are formed, but the number of slits 59 is not limited to five.

As shown in FIGS. 5C, 5D, and 6, the casing 12 includes the outer marginal members (frames) 44C and 44D and inner members (side covers or panels) 46C and 46D.

The outer marginal member 44C is formed by a ring-shaped (frame-shaped) member, for example. The inner member 46C is formed by a board-shaped member, for example. The portion of the outer marginal member 44C positioned on the left-side surface 18C forms the outer margin side of the left-side surface 18C. The inner member 46C is included on the inner side of the outer marginal member 44C. The ventilation path 36C is formed between the inner end of the outer marginal member 44C and the outer end of the inner member 46C. The outer margin of the inner member 46C is larger than the inner margin of the outer marginal member 44C. The inner member 46C is fixed to the casing 12 using an inset type of fixing mechanism (fixing structure) 47. The fixing mechanism 47 is included to correspond to the four corners of the inner member 46C, for example. By releasing the fixing realized by the fixing mechanism 47, it is possible to remove the inner member 46C from the casing 12. The portion of the inner member 46C overlapping with the outer marginal member 44C is positioned farther to the outside of the casing 12 relative to the portion of the outer marginal member 44C overlapping with the inner member 46C. Therefore, in the state where the outer marginal member 44C is fixed to the casing 12, it is possible to remove the inner member 46C.

Figure 11A:
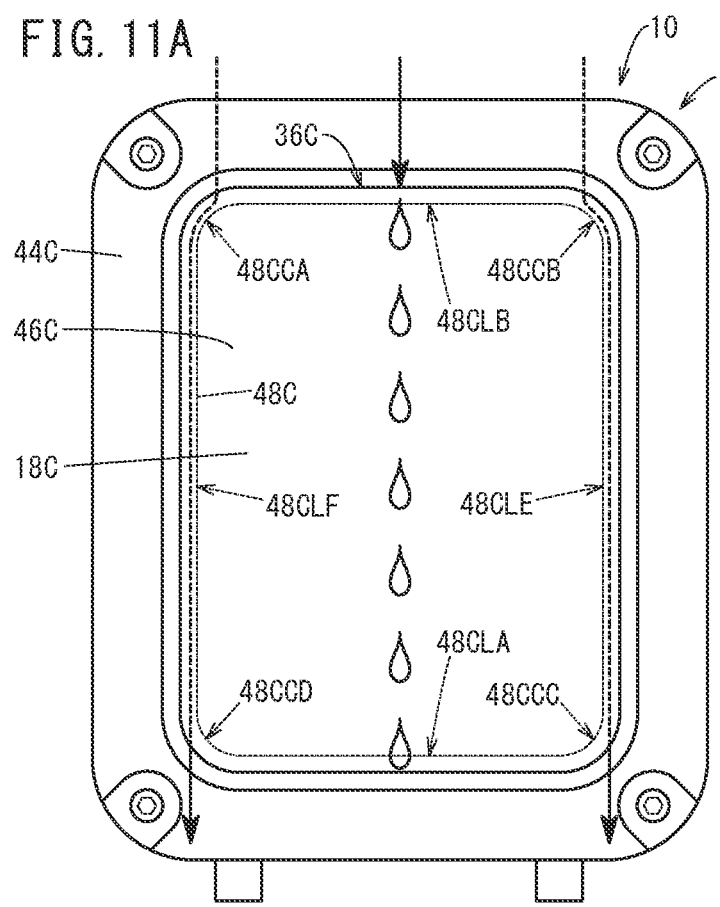
FIGS. 11A, 11B and 11C conceptually show the flow of water.
Figure 11B:
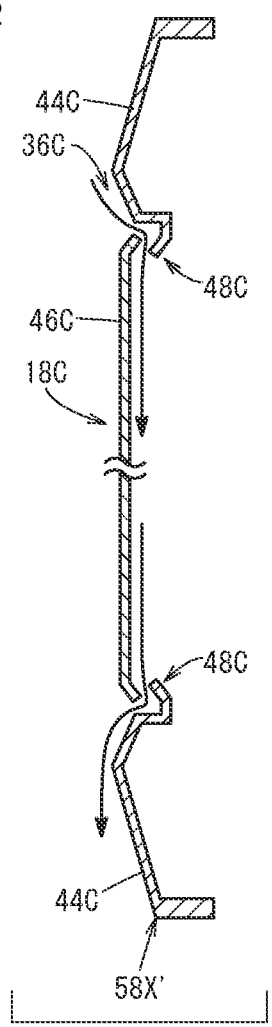
Figure 11C:
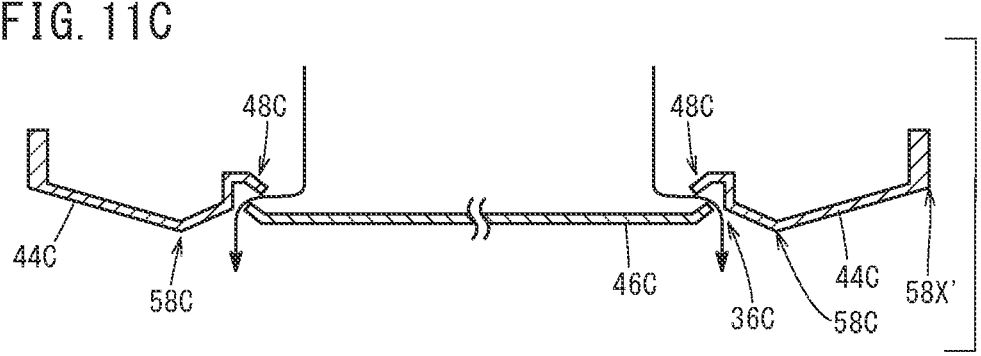

As shown in FIG. 6, the outer marginal member 44C includes a protruding portion (protruding part or barb) 48C that protrudes toward the inner member 46C, in the region where the inner member 46C and the outer marginal member 44C overlap. The protruding portion 48C is provided on the inner margin of the outer marginal member 44C. FIGS. 11A to 11C conceptually show the flow of water. FIG. 11A is a left side view. FIG. 11B is a cross-sectional view of the left side surface 18C. As shown in FIG. 11A, the protruding portion 48C is formed with an annular shape in a manner to follow along the outer periphery of the inner member 46C. The corner portions of the protruding portion 48C formed with the annular shape are curved as shown in FIG. 11A. Specifically, the protruding portion 48C is formed by linear portions 48CLA, 48CLB, 48CLE, and 48CLF and curved portions 48CCA, 48CCB, 48CCC, and 48CCD. The linear portion 48CLA is a portion following along the bottom surface 18A. The linear portion 48CLB is a portion following along the top surface 18B. The linear portion 48CLE is a portion following along the front surface 18E. The linear portion 48CLF is a portion following along the rear surface 18F. The curved portion 48CCA is positioned near the region corresponding to the edge 20A. The curved portion 48CCB is positioned near the region corresponding to the edge 20B. The curved portion 48CCC is positioned near the region corresponding to the edge 20C. The curved portion 48CCD is positioned near the region corresponding to the edge 20D. Since the protruding portion 48C protruding toward the inner member 46C is included on the inner margin of the outer marginal member 44C, the water flowing into the casing 12 via the ventilation path 36C can flow in the manner described below. For example, water that flows into the portion of the ventilation path 36C corresponding to the linear portion 48CLB collides with the protruding portion 48C, and thereafter reaches the inner surface of the inner member 46C. The water having reached the inner surface of the inner member 46C can flow vertically along the inner surface of the inner member 46C (see FIG. 11B). Furthermore, water that flows into the portion of the ventilation path 36C corresponding to the curved portion 48CCA flows along the surface of the outer marginal member 44C while conforming to the shape of the curved portion 48CCA. Then the water flowing along the surface of the outer marginal member 44C while conforming to the shape of the curved portion 48CCA can flow along the surface of the outer marginal member 44C while conforming to the shape of the linear portion 48CLF. Furthermore, water that flows into the portion of the ventilation path 36C corresponding to the curved portion 48CCB flows along the surface of the outer marginal member 44C while conforming to the shape of the curved portion 48CCB. Then the water can flow along the surface of the outer marginal member 44C while conforming to the shape of the linear portion 48CLE. In this way, the protruding portion 48C realizes the role of a gutter.

The positional relationship between the inner member 46C and the outer marginal member 44C, in the direction from the right-side surface 18D toward the left-side surface 18C, is as described below. Specifically, the portion of the outer marginal member 44C positioned farthest in said direction is positioned on said direction side of the portion of the inner member 46C positioned farthest in said direction. In other words, in the normal direction of the left-side surface 18C, the most-protruding portion of the inner member 46C is positioned backward relative to the most-protruding portion of the outer marginal member 44C. Therefore, when the casing 12 is arranged with the left-side surface 18C side in contact with the floor, the outer marginal member 44C contacts the floor but the inner member 46C does not contact the floor. FIG. 11C shows a state in which the casing 12 is arranged with the left-side surface 18C on the bottom side. When water has flowed into the casing 12, this water can be expelled to the outside of the casing 12 via the ventilation path 36C, as shown in FIG. 11C.

The outer marginal member 44D and the outer marginal member 44C have mirror symmetry with respect to the left-right center of the casing 12. Furthermore, the inner member 46D and the inner member 46C have mirror symmetry relative to the left-right center of the casing 12. In a state where the outer marginal member 44D is fixed to the casing 12, the inner member 46D can be removed. The flow of water occurring when water flows into the casing 12 via the ventilation path 36D is the same as the flow of water occurring when water flows into the casing 12 via the ventilation path 36C.

As shown in FIGS. 7 and 8, a board-shaped member 46E is included on the front surface 18E side. A portion 46Eb of the member 46E positioned on the top surface 18B side overlaps with a portion 25E of the member 25 on the front surface 18E side. The portion 46Eb of the member 46E overlapping with the member 25 is positioned on the inner side of the casing 12 relative to the portion 25E of the member 25 overlapping with the member 46E. The partial ventilation path 36Eb is formed between the portion 46Eb of the member 46E positioned on the top surface 18B side and the portion 25E of the member 25 positioned on the front surface 18E side. In the manner described above, the ventilation path 36E is formed by the partial ventilation path 36Ea and the partial ventilation path 36Eb.

The positional relationship between the member 46E and the outer marginal members 44C and 44D, in the direction from the rear surface 18F toward the front surface 18E, is as described below. Specifically, the portions of the outer marginal members 44C and 44D positioned farthest in said direction are positioned on said direction side of the portion of the member 46E positioned farthest in said direction. In other words, in the normal direction of the front surface 18E, the most-protruding portion of the member 46E is positioned backward relative to the most-protruding portions of the outer marginal members 44C and 44D. Therefore, when the casing 12 is arranged such that the front surface 18E side contacts the floor, the outer marginal members 44C and 44D contact the floor, but the member 46E does not contact the floor and the ventilation path 36E does not become blocked by the floor. Therefore, according to the present embodiment, even when the casing 12 is arranged such that the front surface 18E side contacts the floor, the air expelled by the blower 52 described further below can be expelled to the outside of the casing 12 via the ventilation path 36E.

As shown in FIGS. 7 and 9, a board-shaped member 46F is included on the rear surface 18F side. The partial ventilation path 36Fa is formed between the portion 56f described above and the member 46F. The partial ventilation path 36Fa is included in the recessed space 54 described above. Since the partial ventilation path 36Fa is included inside the recessed space 54 and not on the surface of the casing 12, it is difficult for foreign matter to enter into the casing 12 via the partial ventilation path 36Fa. The partial ventilation path 36Fb is formed between a portion of the member 46F positioned on the top surface 18B side and a member 49 included to the top surface 18B side of the member 46F. The member 49 is positioned between the cover portion 32 and the member 46F. In the manner described above, the ventilation path 36F is formed by the partial ventilation path 36Fa and the partial ventilation path 36Fb.

As shown in FIG. 6, the partial ventilation path 36Ac is formed between the portion 56a and the outer marginal member 44C. Furthermore, the partial ventilation path 36Ad is formed between the portion 56a and the outer marginal member 44D. In the manner described above, the ventilation path 36A is formed by the partial ventilation path 36Ac and the partial ventilation path 36Ad. Since the casing 12 is not arranged with the top surface 18B facing the floor, there are no instances where the casing 12 is arranged such that the bottom surface 18A in which the ventilation path 36A is formed faces upward. Therefore, there is only a low possibility of foreign matter entering into the casing 12 via the ventilation path 36A, which means that there is only a low possibility of this foreign matter reaching a power converting apparatus 17 described further below. In the manner described above, the ventilation path 36A is formed by the partial ventilation path 36Ac and the partial ventilation path 36Ad.

As shown in FIGS. 7 and 10, a portion 46Ea of the member 46E positioned on the bottom surface 18A side overlaps with a portion 56ex of the member 56 on the front surface 18E side. The portion 46Ea of the member 46E overlapping with the member 56 is positioned on the inner side of the casing 12 relative to the portion 56ex of the member 56 overlapping with the member 46E. The partial ventilation path 36Ea is formed between the portion 46Ea of the member 46E positioned on the bottom surface 18A side and the portion 56ex of the member 56 positioned on the front surface 18E side.

The cross-sectional area (opening size) of the ventilation path 36E and the cross-sectional area of the ventilation path 36A differ from each other. More specifically, the cross-sectional area of the ventilation path 36A is smaller than the cross-sectional area of the ventilation path 36E. The cross-sectional area of the ventilation path 36C is equivalent to the cross-sectional area of the ventilation path 36D. The cross-sectional area of the ventilation path 36C and the cross-sectional area of the ventilation path 36E differ from each other. More specifically, the cross-sectional area of the ventilation path 36C is smaller than the cross-sectional area of the ventilation path 36E. The cross-sectional area of the ventilation path 36D and the cross-sectional area of the ventilation path 36E differ from each other. The cross-sectional area of the ventilation path 36D is smaller than the cross-sectional area of the ventilation path 36E. The cross-sectional area of the ventilation path 36E and the cross-sectional area of the ventilation path 36F differ from each other. More specifically, the cross-sectional area of the ventilation path 36F is smaller than the cross-sectional area of the ventilation path 36E. In this way, in the present embodiment, the cross-sectional areas of the ventilation paths 36A, 36C, 36D, and 36F for sucking in air using the blower 52 described further below are set to be relatively small. Therefore, according to the present embodiment, it is possible to restrict foreign matter from entering into the casing 12 via the ventilation paths 36A, 36C, 36D, and 36F. On the other hand, in the present embodiment, the cross-sectional area of the ventilation path 36E for expelling air using the blower 52 described further below is set to be relatively large. Therefore, according to the present embodiment, even in the extremely rare situation where foreign matter has entered into the casing 12, it is possible to effectively expel this foreign matter.

Figure 12A:
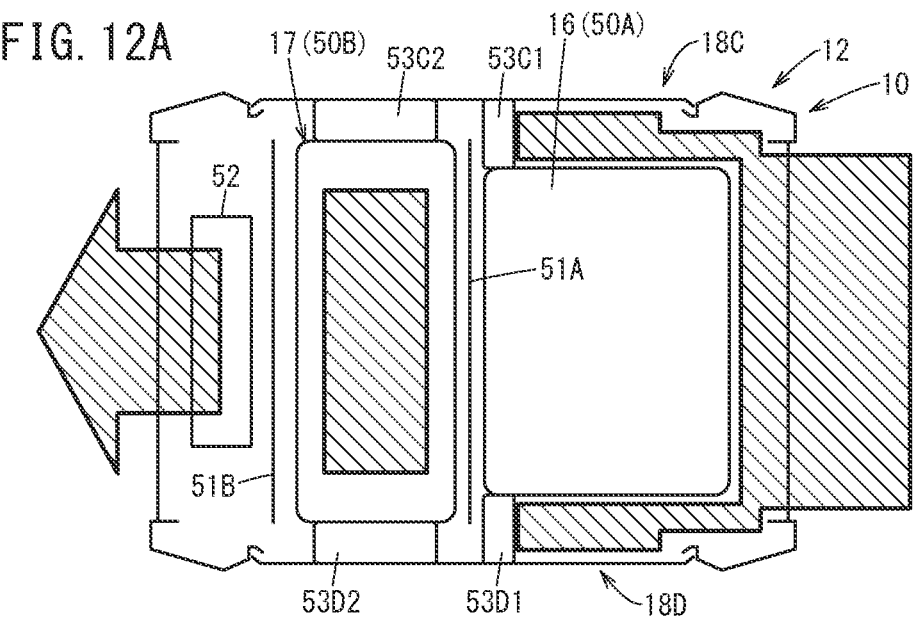
FIGS. 12A and 12B show the charging power supply device according to an embodiment.
Figure 12B:
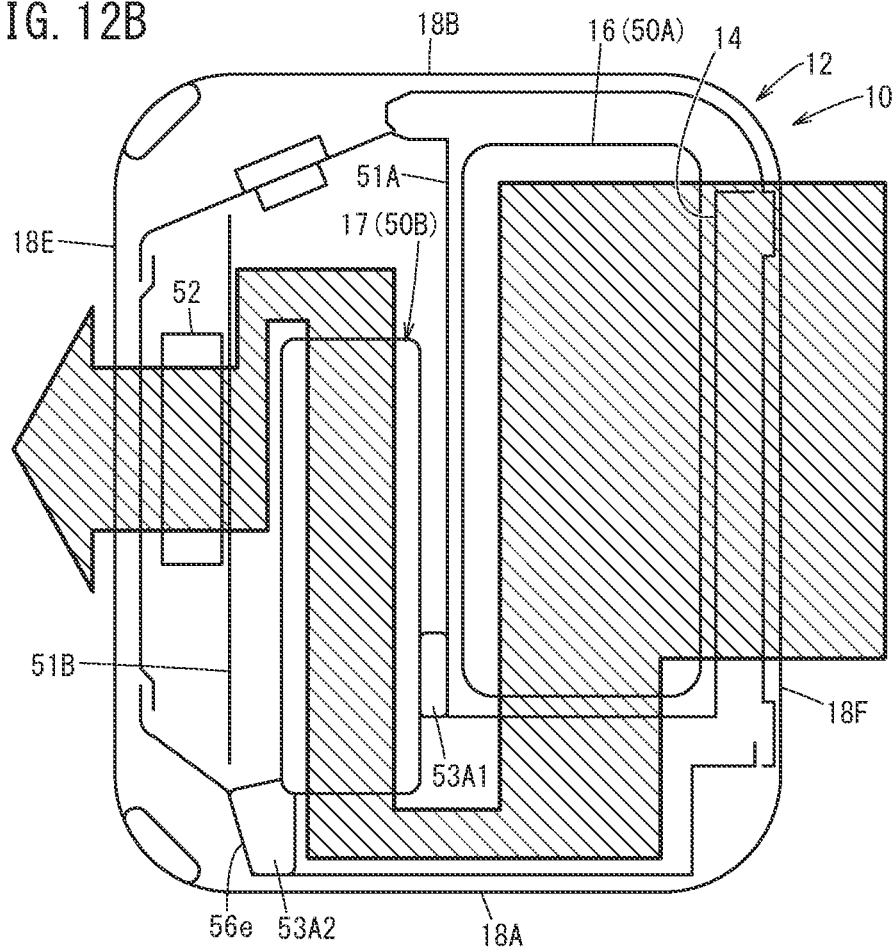

FIGS. 12A and 12B show the charging power supply device according to the present embodiment. FIG. 12A is a horizontal cross-sectional view seen from the top surface 18B side. FIG. 12B is a vertical cross-sectional view seen from the right-side surface 18D side. In FIGS. 12A and 12B, the arrows with hatching conceptually show the flow of air.

As shown in FIGS. 12A and 12B, a plurality of heating bodies 50A and 50B are included. The reference numeral 50 is used when describing a heating body in general, and the reference numerals 50A and 50B are used when describing each individual heating body. Furthermore, the blower (fan) 52 for cooling the heating bodies 50A and 50B is also included in the casing 12. The blower 52 sends air from the right side to the left side in FIGS. 12A and 12B. The heating bodies 50A and 50B are positioned downstream from the ventilation paths 36A, 36C, 36D, and 36F. The heating bodies 50A and 50B are positioned upstream from the blower 52. The heating body 50A is the battery 16, for example. The heating body 50B is the power converting apparatus (invertor converter unit) 17, for example. The heating body 50B will reach a higher temperature than the heating body 50A. The heating body 50A is arranged upstream from the heating body 50B. There is a partition wall 51A between the containment chamber 14 in which the heating body 50A is housed and the portion (containment chamber) where the heating body 50B is housed. There is a partition wall 51B between the portion where the heating body 50B is housed and the portion where the blower 52 is housed. As shown in FIG. 12A, a barrier member (sealing material) 53C1 is included between the portion of the heating body 50A on the front surface 18E side and the left-side surface 18C. A barrier member 53D1 is included between the portion of the heating body 50A on the front surface 18E side and the right-side surface 18D. A barrier member 53C2 is included between the heating body 50B and the left-side surface 18C. A barrier member 53D2 is included between the heating body 50B and the right-side surface 18D. As shown in FIG. 12B, a barrier member 53A1 is included between the bottom end portion of the partition wall 51A and the heating body 50B. A barrier member 53A2 is included between the portion of the heating body 50B on the front surface 18E side and the portion 56e. The barrier members 53C1, 53D1, 53C2, 53D2, 53A1, and 53A2 are for blocking the flow of air. The barrier members 53C1, 53D1, 53C2, 53D2, 53A1, and 53A2 can be formed by a foam sealant, for example, but are not limited to this. Since the heating bodies 50A and 50B, the blower 52, the partition walls 51A and 51B, and the barrier members 53A1, 53A2, 53C1, 53C2, 53D1, and 53D2 are arranged this way, the air flows inside the casing 12 as shown by the arrow marks.

FIGS. 13A to 13F show six orthogonal views of the charging power supply device according to the present embodiment. FIG. 13A is a bottom view, FIG. 13B is a top view, FIG. 13C is a left side view, FIG. 13D is a right side view, FIG. 13E is a front view, and FIG. 13F is a rear view. FIG. 13 shows a state in which the grounding protrusions 38 (see FIGS. 5C to 5F) are removed.

When the casing 12 is arranged such that the bottom surface 18A is in contact with the floor, the positional relationship between the outer marginal members 44C and 44D and the floor, in the direction from the top surface 18B toward the bottom surface 18A, is as described below. Specifically, a portion (region) 58Ac (see FIG. 14) of the outer marginal member 44C positioned farthest in said direction and a portion 58Ad of the outer marginal member 44D positioned farthest in said direction are in contact with the floor. These portions 58Ac and 58Ad are linear, as shown in FIG. 13A. Since the entire bottom surface 18A does not contact the floor and the liner portions 58Ac and 58Ad do contact the floor, the frictional force occurring when the casing 12 is slid in the longitudinal direction of these portions 58Ac and 58Ad is relatively small. Accordingly, when the casing 12 is slid in the direction of an arrow mark 60A shown in FIG. 13A, it is possible for the casing 12 to be slid with relatively little force. In this way, when the casing 12 is arranged such that the bottom surface 18A is in contact with the floor, the casing 12 can be slid in the direction from the front surface 18E toward the rear surface 18F with relatively little force. Furthermore, when the casing 12 is arranged such that the bottom surface 18A is in contact with the floor, the casing 12 can be slid in the direction from the rear surface 18F toward the front surface 18E with relatively little force.

Figure 14:
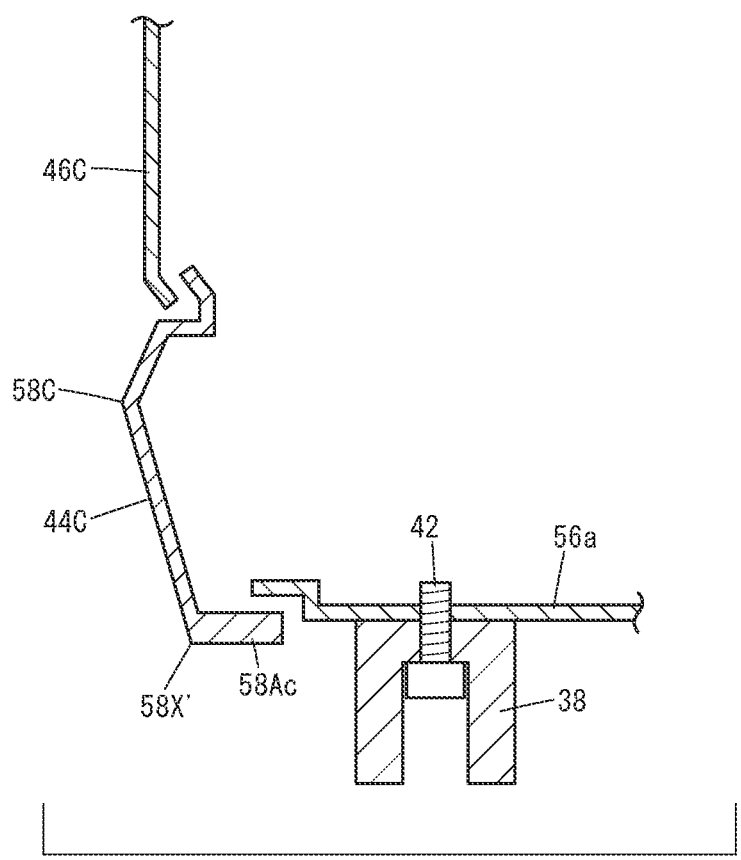
FIG. 14 is a cross-sectional view of a portion of the charging power supply device according to an embodiment.

When the casing 12 is arranged such that the left-side surface 18C is in contact with the floor, the positional relationship between the outer marginal member 44C and the floor, in the direction from the right-side surface 18D toward the left-side surface 18C, is as described below. Specifically, a portion 58C (see FIG. 11C) of the outer marginal member 44C positioned farthest in said direction is in contact with the floor. FIG. 14 is a cross-sectional view of a portion of the charging power supply device according to the present embodiment. FIG. 14 shows a state in which the grounding protrusion 38 is attached to the bottom surface 18A side. As shown in FIG. 13C, the portion 58C is a substantially rectangular frame, that is, a substantially rectangular ring. Since the entire left-side surface 18C is not in contact with the floor and the ring-shaped portion 58C is in contact with the floor, the frictional force is relatively low when the casing 12 slides. Accordingly, when the casing 12 is slid in the direction of an arrow mark 60C shown in FIG. 13C, the casing 12 can be slid with relatively little force. In this way, when the casing 12 is arranged such that the left-side surface 18C is in contact with the floor, the casing 12 can be slid in the direction from the front surface 18E toward the rear surface 18F with relatively little force. Furthermore, when the casing 12 is arranged such that the left-side surface 18C is in contact with the floor, the casing 12 can be slid in the direction from the rear surface 18F toward the front surface 18E with relatively little force. When the casing 12 is arranged such that the left-side surface 18C is in contact with the floor, the casing 12 can be slid in the direction from the bottom surface 18A toward the top surface 18B with relatively little force. When the casing 12 is arranged such that the left-side surface 18C is in contact with the floor, the casing 12 can be slid in the direction from the top surface 18B toward the bottom surface 18A with relatively little force.

When the casing 12 is arranged such that the left-side surface 18C is in contact with the floor, the ring-shaped portion 58C contacts the floor, and therefore the air intake via the ventilation path 36C included in the left-side surface 18C is restricted. Due to this, in such a case, foreign matter is restricted from entering into the casing 12 via the ventilation path 36C.

When the casing 12 is arranged such that the right-side surface 18D is in contact with the floor, the positional relationship between the outer marginal member 44D and the floor, in the direction from the left-side surface 18C toward the right-side surface 18D, is as described below. Specifically, a portion 58D of the outer marginal member 44D positioned farthest in said direction is in contact with the floor. The right-side surface 18D and the left-side surface 18C have mirror symmetry with respect to the left-right center of the casing 12. Accordingly, when the casing 12 is arranged such that the right-side surface 18D is in contact with the floor, the casing 12 can be slid with relatively little force, in the same manner as when the casing 12 is arranged such that the left-side surface 18C is in contact with the floor. Furthermore, when the casing 12 is arranged such that the right-side surface 18D is in contact with the floor, foreign matter is restricted from entering into the casing 12 via the ventilation path 36D, in the same manner as when the casing 12 is arranged such that the left-side surface 18C is in contact with the floor.

When the casing 12 is arranged such that the front surface 18E is in contact with the floor, the positional relationship between the outer marginal members 44C and 44D and the floor, in the direction from the rear surface 18F toward the front surface 18E, is as described below. Specifically, a portion 58Ec of the outer marginal member 44C positioned farthest in said direction and a portion 58Ed of the outer marginal member 44D positioned farthest in said direction are in contact with the floor. These portions 58Ec and 58Ed are linear, as shown in FIG. 13E. Since the entire front surface 18E is not in contact with the floor and the linear portions 58Ec and 58Ed are in contact with the floor, the frictional force is relatively small when the casing 12 is slid in the longitudinal direction of these portions 58Ec and 58Ed. Accordingly, when the casing 12 is slid in the direction of an arrow mark 60E shown in FIG. 13E, it is possible for the casing 12 to be slid with relatively little force. In this way, when the casing 12 is arranged such that the front surface 18E is in contact with the floor, the casing 12 can be slid in the direction from the bottom surface 18A toward the top surface 18B with relatively little force. Furthermore, when the casing 12 is arranged such that the front surface 18E is in contact with the floor, the casing 12 can be slid in the direction from the top surface 18B toward the bottom surface 18A with relatively little force.

When the casing 12 is arranged such that the rear surface 18F is in contact with the floor, the positional relationship between the outer marginal members 44C and 44D and the floor, in the direction from the front surface 18E toward the rear surface 18F, is as described below. Specifically, a portion 58Fc of the outer marginal member 44C positioned farthest in said direction and a portion 58Fd of the outer marginal member 44D positioned farthest in said direction are in contact with the floor. These portions 58Fc and 58Fd are linear, as shown in FIG. 13F. Since the entire rear surface 18F is not in contact with the floor and the linear portions 58Fc and 58Fd are in contact with the floor, the frictional force is relatively small when the casing 12 is slid in the longitudinal direction of these portions 58Fc and 58Fd. Accordingly, when the casing 12 is slid in the direction of an arrow mark 60F shown in FIG. 13F, it is possible for the casing 12 to be slid with relatively little force. In this way, when the casing 12 is arranged such that the rear surface 18F is in contact with the floor, the casing 12 can be slid in the direction from the bottom surface 18A toward the top surface 18B with relatively little force. Furthermore, when the casing 12 is arranged such that the rear surface 18F is in contact with the floor, the casing 12 can be slid in the direction from the top surface 18B toward the bottom surface 18A with relatively little force.

Figure 15:
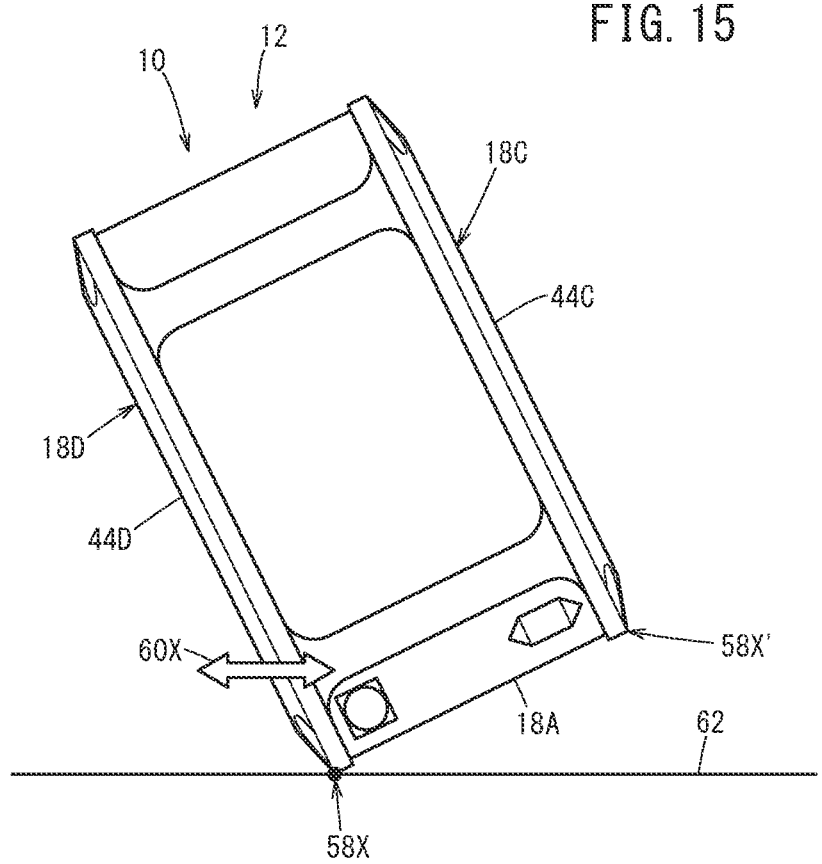
FIG. 15 shows a state in which the casing is inclined.

FIG. 15 shows a state in which the casing is inclined. FIG. 15 shows a state in which the casing 12 is inclined such that only the region corresponding to the edge 20G, which is positioned at the region where the bottom surface 18A and the right-side surface 18D intersect, is in contact with a floor 62. When the casing 12 is inclined in this way, the positional relationship between the outer marginal member 44D and the floor 62, in the direction from the casing 12 toward the floor 62, is as described below. Specifically, a portion 58X of the outer marginal member 44D positioned farthest in said direction is in contact with the floor 62. This portion 58X is linear. Since the portion 58X in contact with the floor 62 is linear, the frictional amount is relatively small when the casing 12 is slid in a direction intersecting the longitudinal direction of this portion 58X. Accordingly, when the casing 12 is slid in the direction of an arrow mark 60X shown in FIG. 15, the casing 12 can be slid with relatively little force. When the casing 12 is inclined to the opposite side, the positional relationship between the outer marginal member 44C and the floor 62, in the direction from the casing 12 toward the floor 62, is as described below. Specifically, a portion 58X' of the outer marginal member 44C positioned farthest in said direction is in contact with the floor 62. This portion 58X' is linear. Since the portion 58X' in contact with the floor 62 is linear, the frictional amount is relatively small when the casing 12 is slid in a direction intersecting the longitudinal direction of this portion 58X'. Accordingly, even in a case where the casing 12 is inclined to the opposite side, when the casing 12 is slid in the direction of the arrow mark 60X shown in FIG. 15, the casing 12 can be slid with relatively little force.

Figure 16:
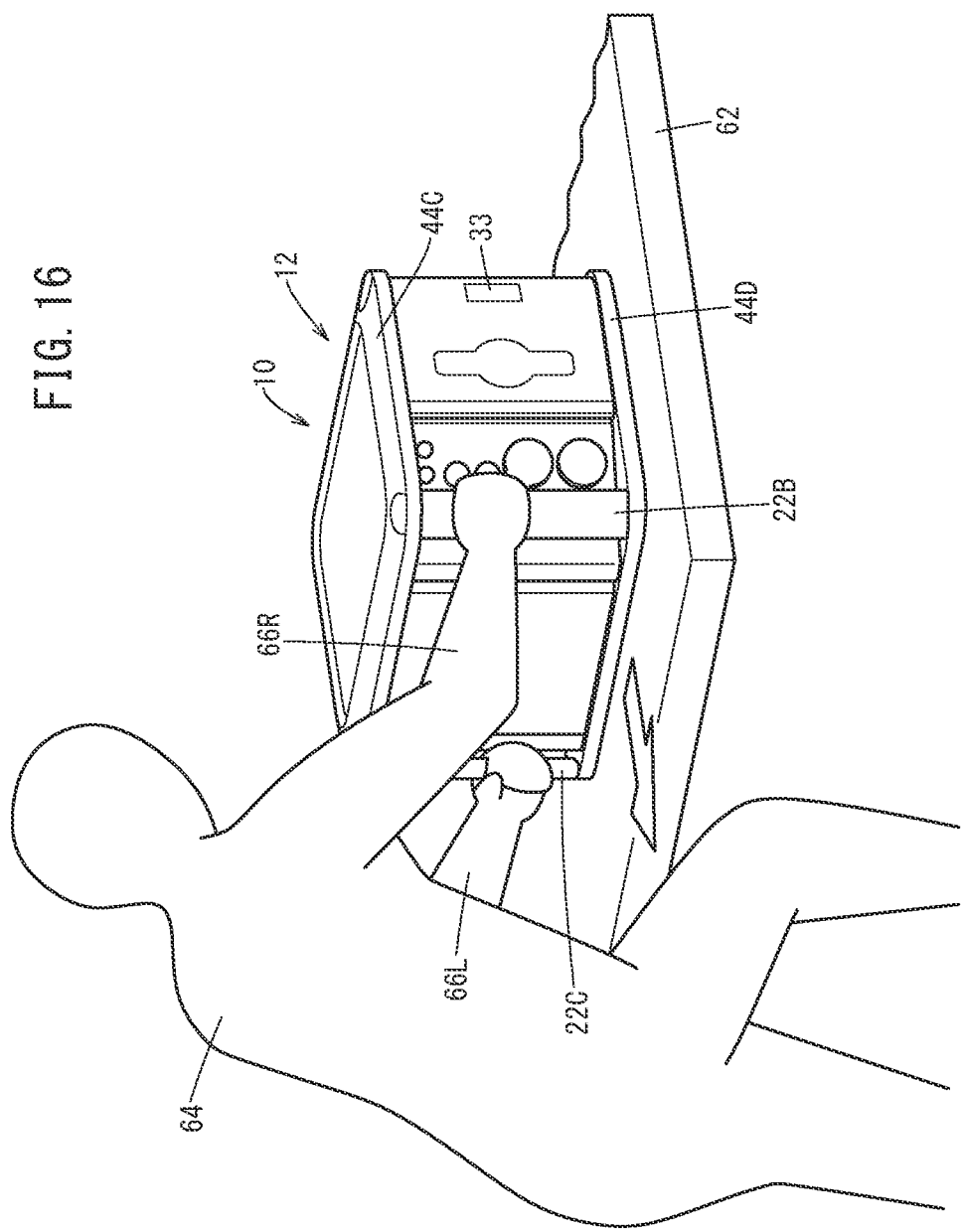
FIG. 16 shows an example of a case of transporting the charging power supply device according to an embodiment.

FIG. 16 shows an example of a case of transporting the charging power supply device according to the present embodiment. FIG. 16 shows an example of a case in which the casing 12 is arranged on the floor 62 such that the right-side surface 18D is on the bottom. The floor 62 shown in FIG. 16 is a loading platform or the like of an automobile, for example, but is not limited to this. FIG. 16 shows an example of a case in which the height of the floor 62 on which the casing 12 is arranged is greater than the height of the floor (not shown in the drawings) on which a user 64 is standing. FIG. 16 shows an example of a case in which the handle portion 22B is gripped by a right hand 66R of the user 64, and the handle portion 22C is gripped by a left hand 66L of the user 64. While gripping the handle portions 22B and 22C, the user 64 can pull the charging power supply device 10 out from the loading platform or the like of the automobile.

Figure 17:
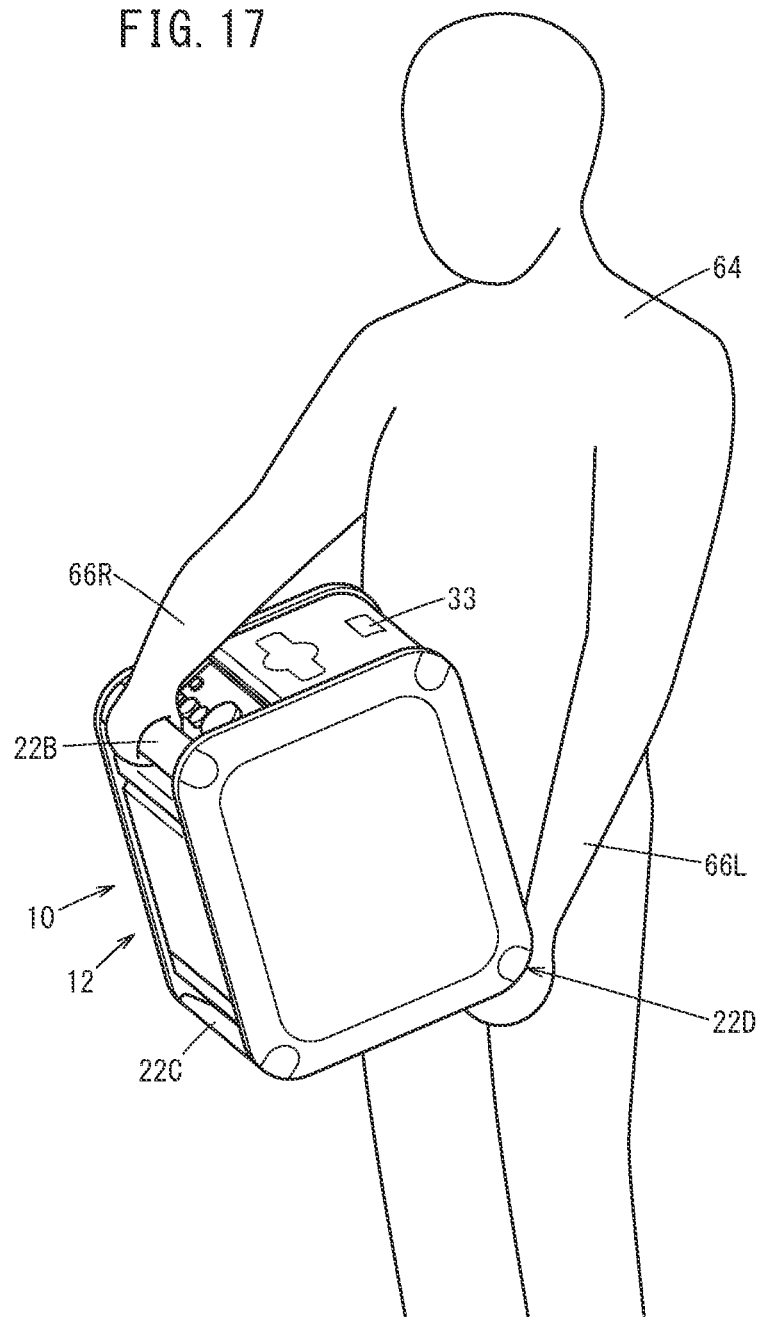
FIG. 17 shows an example of a case of transporting the charging power supply device according to an embodiment.

FIG. 17 shows an example of a case of transporting the charging power supply device according to the present embodiment. FIG. 17 shows an example of a case in which the user 64 carries the charging power supply device 10 alone. FIG. 17 shows an example of a case where the handle portion 22B is gripped by the right hand 66R of the user 64 and the handle portion 22D is gripped by the left hand 66L of the user 64. While gripping the handle portions 22B and 22D, the user 64 can carry the charging power supply device 10.

Figure 18:
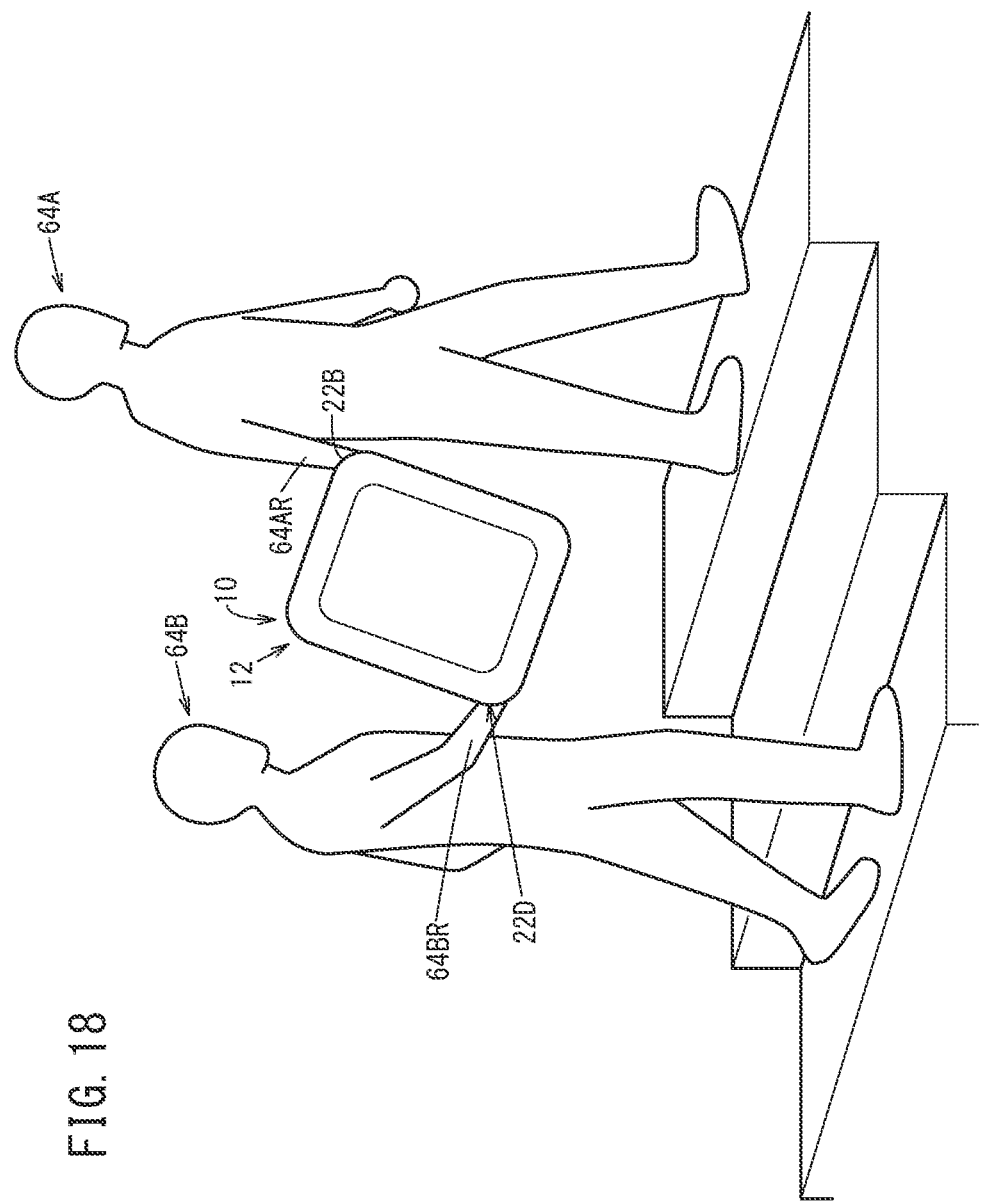
FIG. 18 shows an example of a case of transporting the charging power supply device according to an embodiment.

FIG. 18 shows an example of a case of transporting the charging power supply device according to the present embodiment. FIG. 18 shows an example where two users 64A and 64B cooperate to carry the charging power supply device 10. FIG. 18 shows an example of a case where, when climbing a staircase, the user 64A is positioned in front and the user 64B is positioned to the rear. FIG. 18 shows an example of a case in which the handle portion 22B is gripped by a right hand 64AR of the user 64A and the handle portion 22D is gripped by a right hand 64BR of the user 64B. The users 64A and 64B can carry the charging power supply device 10 in this way as well.

Figure 19:
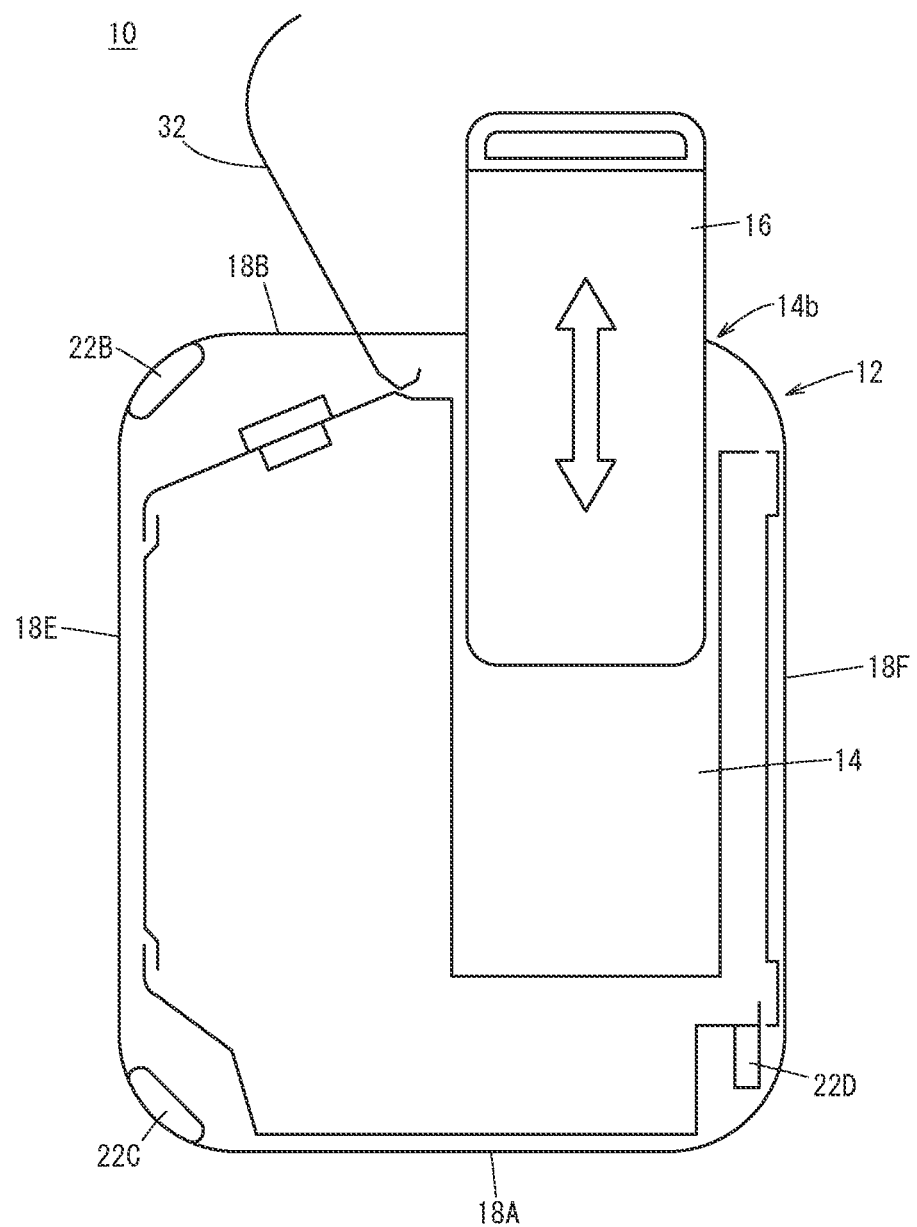
FIG. 19 shows an example of inserting or removing a battery into and from a containment chamber.

FIG. 19 shows an example of inserting or removing a battery into and from a containment chamber. FIG. 19 shows an example of a case where the casing 12 is arranged such that the bottom surface 18A faces the floor 62. FIG. 19 shows an example of a case in which the battery 16 is inserted or removed into or from the containment chamber 14 in the depth direction of the containment chamber 14 (in the vertical direction). The user can insert or remove the battery 16 into or from the containment chamber 14 in this way.

Figure 20:
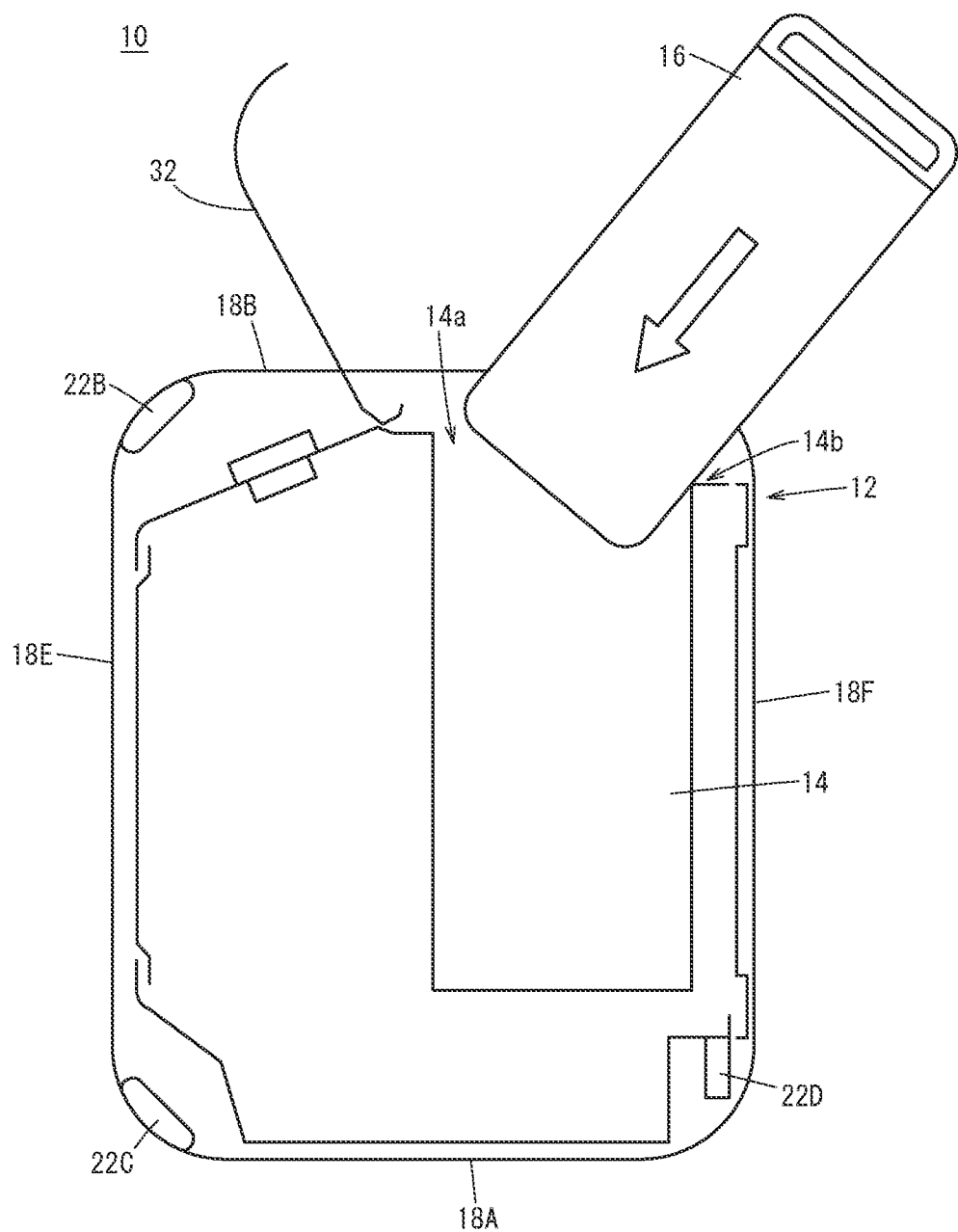
FIG. 20 shows an example of inserting the battery into the containment chamber.

FIG. 20 shows an example of inserting the battery into the containment chamber. FIG. 20 shows an example of a case where the casing 12 is arranged such that the bottom surface 18A faces the floor 62. As described above, the opening 14a continuous with the containment chamber 14, or the peripheral edge portion 14b of the opening 14a continuous with the containment chamber 14, is positioned at the portion corresponding to the edge 20A. The handle portions 22B to 22D are not provided at the position corresponding to the edge 20A. Since the opening 14a continuous with the containment chamber 14, or the peripheral edge portion 14b of the opening 14a continuous with the containment chamber 14, is positioned at the portion corresponding to the edge 20A, the portion of the inner side surface of the containment chamber 14 on the rear surface 18F side can function as a guide portion (guiding portion) when inserting the battery 16. In this way, the battery 16 can be inserted into the containment chamber 14 from a direction inclined relative to the depth direction of the containment chamber 14. In other words, the battery 16 can be inserted into the containment chamber 14 from a direction other than the depth direction of the containment chamber 14.

Figure 21:
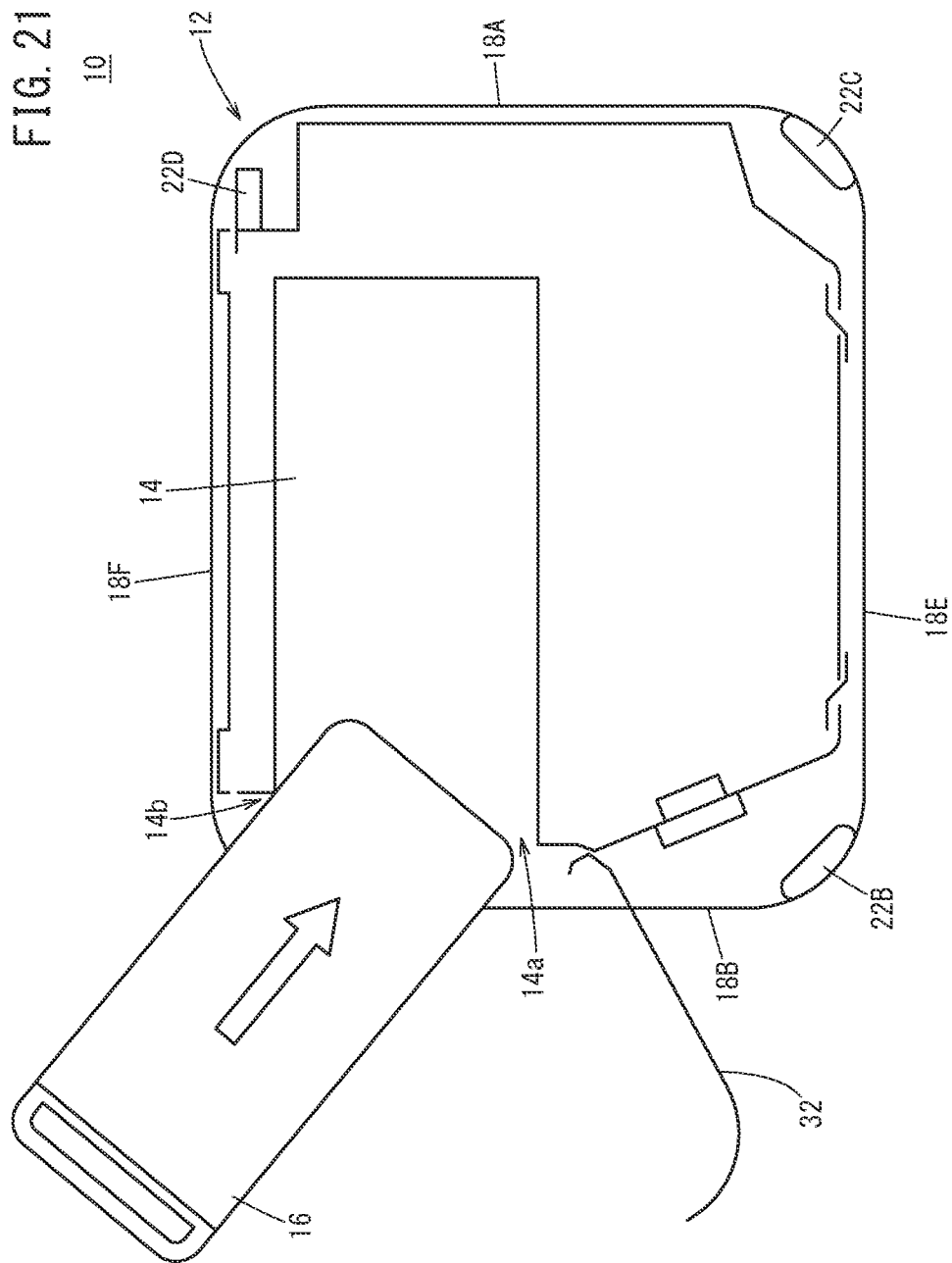
FIG. 21 shows an example of inserting the battery into the containment chamber.

FIG. 21 shows an example of inserting the battery into the containment chamber. FIG. 21 shows an example of a case where the casing 12 is arranged such that the front surface 18E faces the floor 62. As described above, the opening 14a continuous with the containment chamber 14, or the peripheral edge portion 14b of the opening 14a continuous with the containment chamber 14, is positioned at the portion corresponding to the edge 20A. A handle portion 22 is not provided at the portion corresponding to the edge 20A. Since the opening 14a continuous with the containment chamber 14, or the peripheral edge portion 14b of the opening 14a continuous with the containment chamber 14, is positioned at the portion corresponding to the edge 20A, the portion of the inner side surface of the containment chamber 14 on the rear surface 18F side can function as the guide portion when inserting the battery 16. In this way, the battery 16 can be inserted into the containment chamber 14 from a direction inclined relative to the depth direction of the containment chamber 14. In other words, the battery 16 can be inserted into the containment chamber 14 from a direction other than the depth direction of the containment chamber 14.

Figure 22:
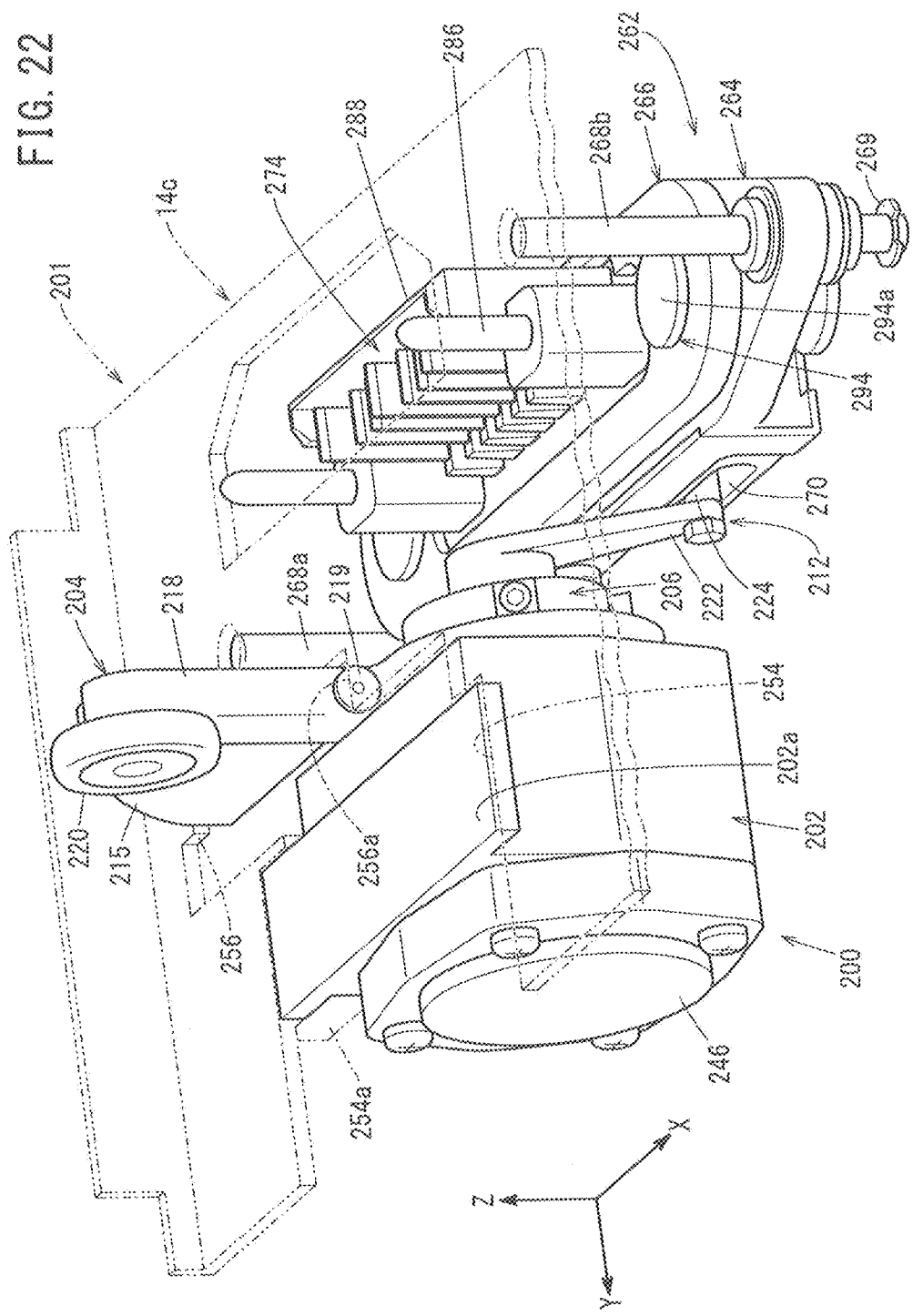
FIG. 22 is a perspective view showing a motive power transmission device according to an embodiment.
Figure 23:
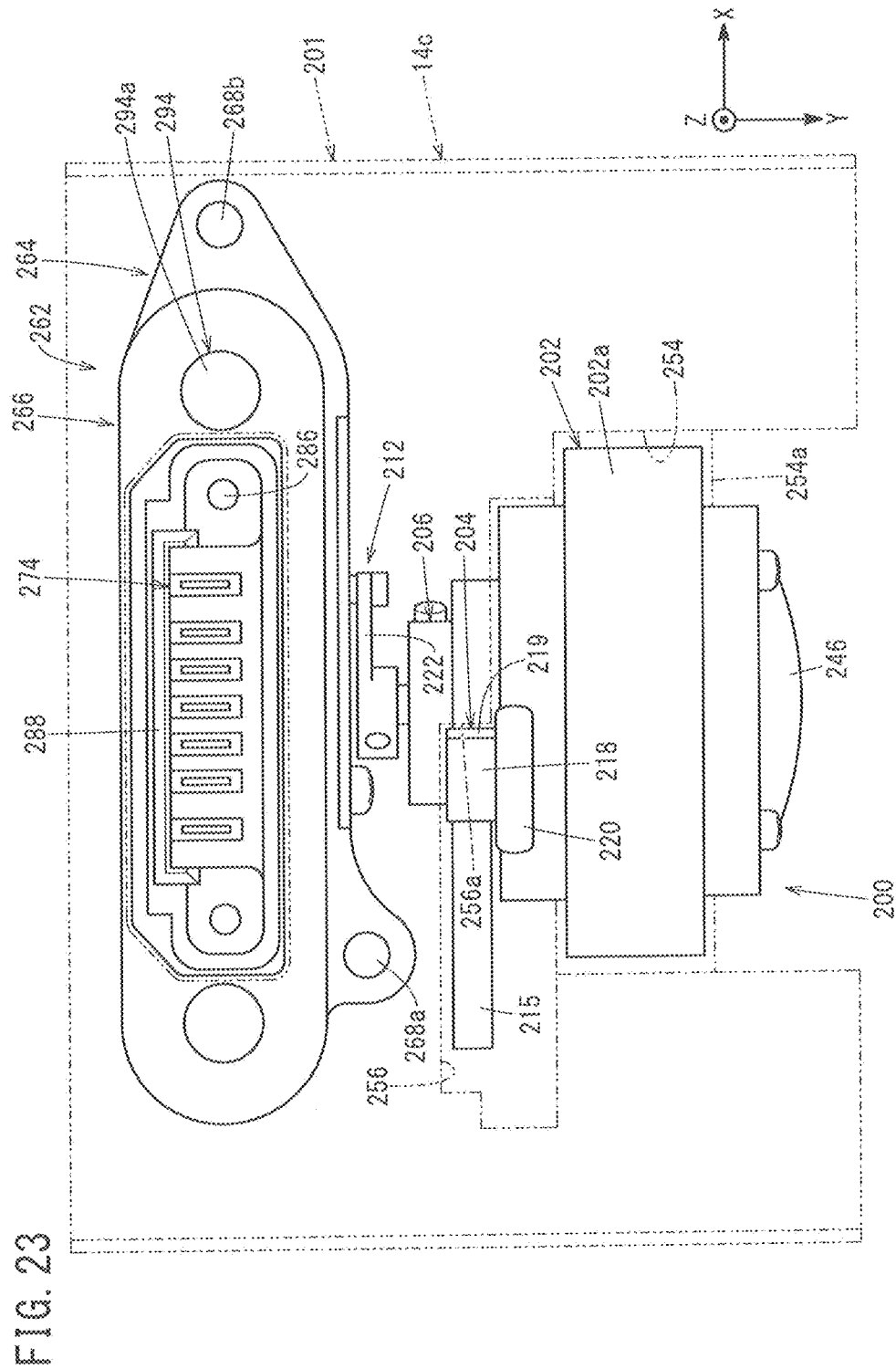
FIG. 23 is a top view showing the motive power transmission device according to an embodiment.
Figure 24:
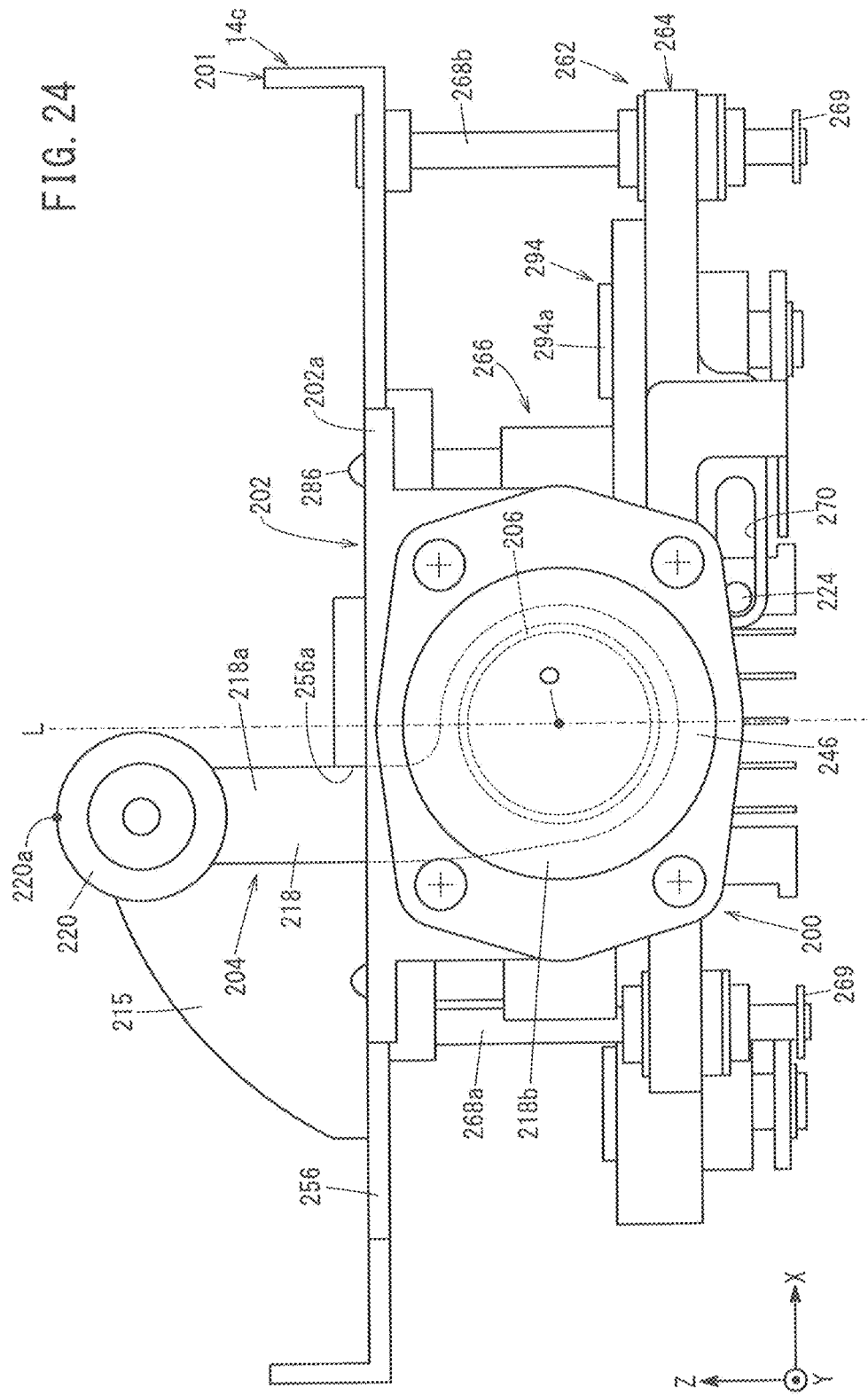
FIG. 24 is a side view showing the motive power transmission device according to an embodiment.
Figure 25:
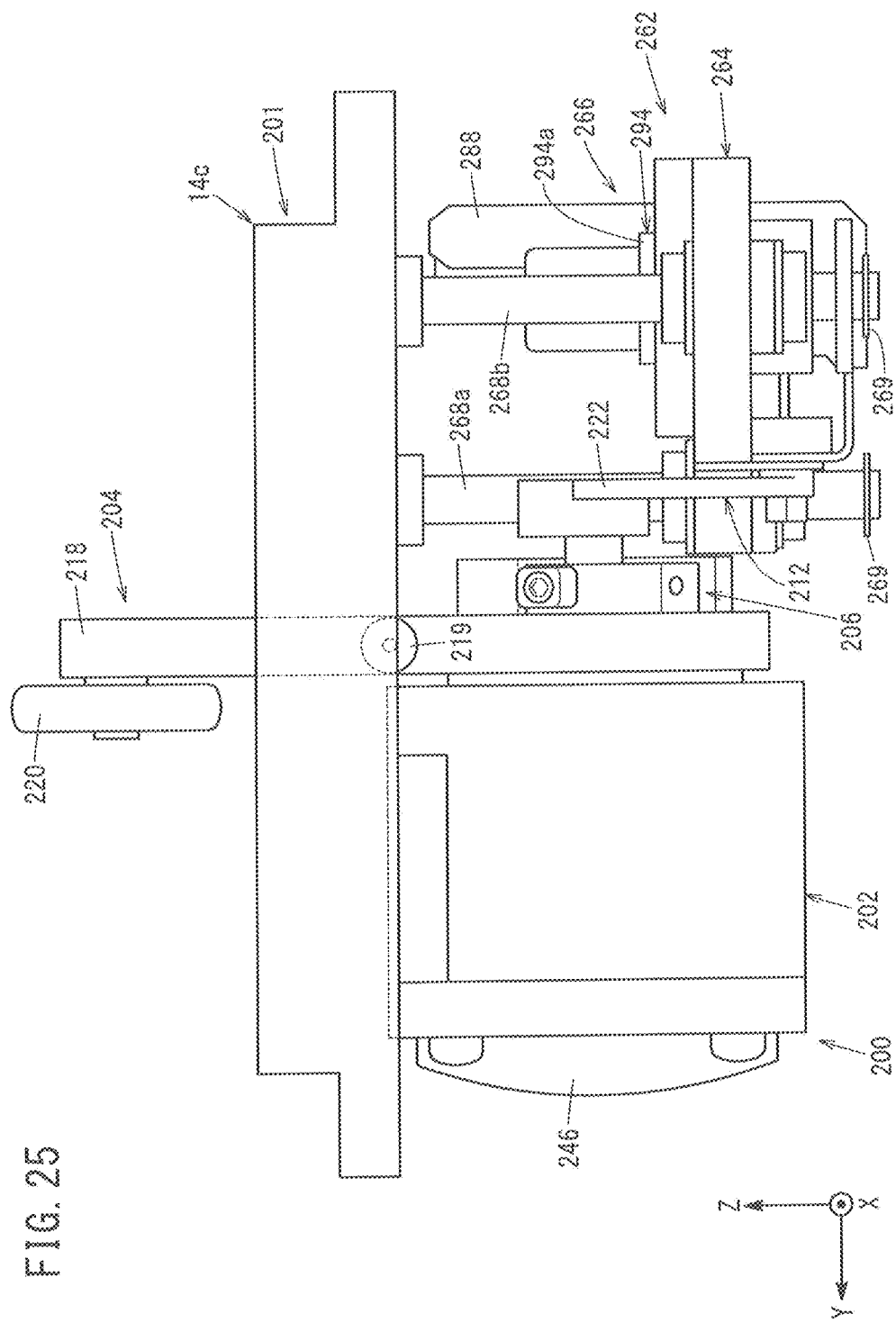
FIG. 25 is a side view showing the motive power transmission device according to an embodiment.

FIG. 22 is a perspective view showing the motive power transmission device. FIG. 23 is a top view showing the motive power transmission device. FIG. 24 is a side view showing the motive power transmission device. FIG. 25 is a side view showing the motive power transmission device. In FIGS. 22 to 25, a connector unit 262 is shown together with a motive power transmission device 200. The motive power transmission device 200 and the connector unit 262 are disposed on a bottom surface 14c of the containment chamber 14 (FIG. 3) of the casing 12.

The connector unit 262 includes a connector 266 having a casing-side connection terminal 274 that is connected to a battery-side connection terminal 272 (FIG. 31) provided on the bottom surface of the battery 16 contained in the containment chamber 14. The connector unit 262 is provided so as to be movable in the vertical direction (Z direction) along two poles 268a and 268b extending from a plate 201 of the bottom surface 14c toward the negative side in the Z direction.

The motive power transmission device 200 is a device that, when the battery 16 is contained in the containment chamber 14, transmits a force acting on the motive power transmission device 200 from the battery 16 to the connector unit 262 to move the connector unit 262 to the battery 16 side (positive side in the Z direction). By the structure, the connector 266 moves from the negative side in the Z direction of the plate 201 to the positive side in the Z direction, and the casing-side connection terminal 274 are connected to the battery-side connection terminal 272 of the battery 16.

Figure 26:
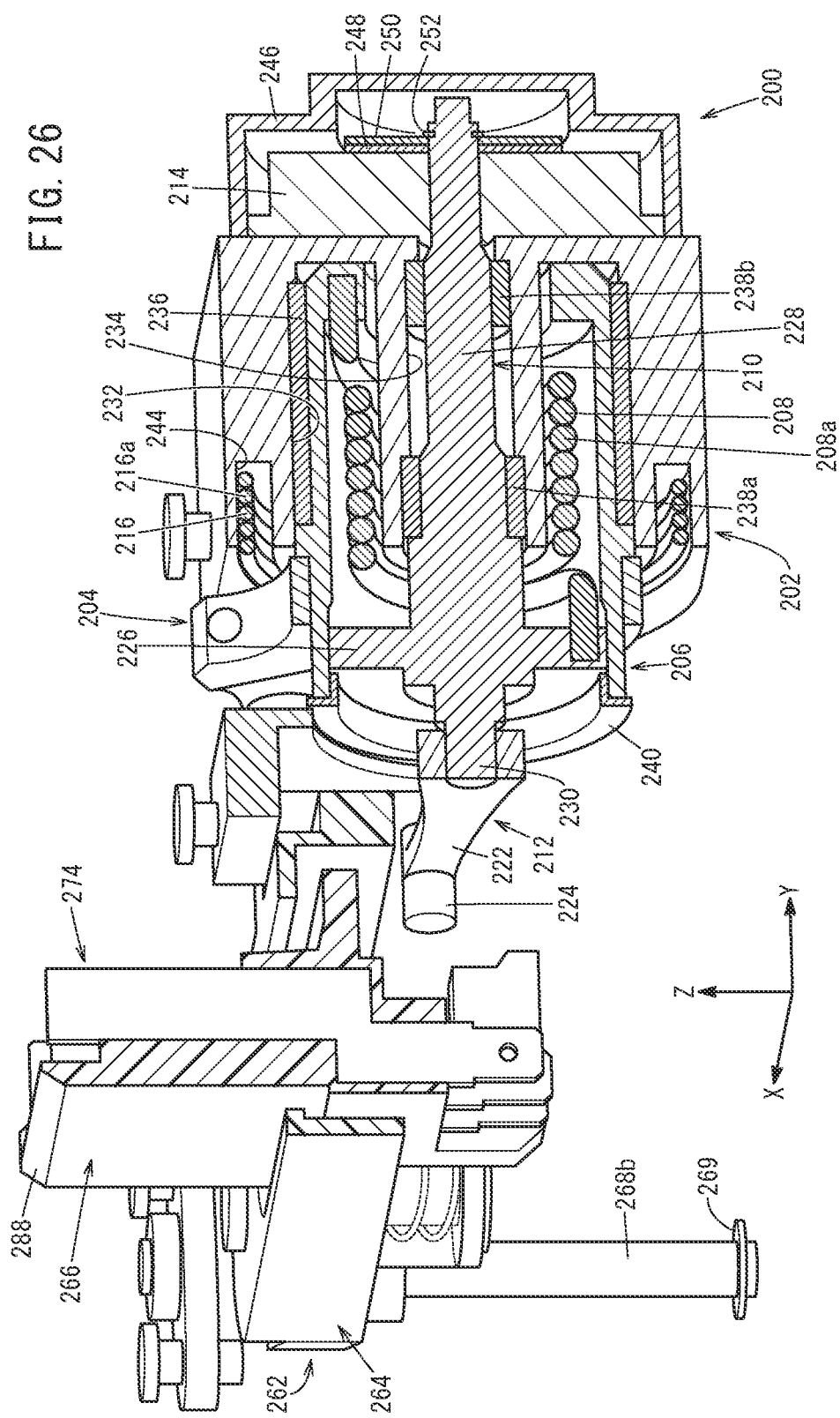
FIG. 26 is a cross-sectional view showing the motive power transmission device according to an embodiment.

FIG. 26 is a cross-sectional perspective view showing the motive power transmission device. In FIG. 26, a part of the connector unit 262 is omitted. FIG. 26 shows the motive power transmission device 200 in a state in which an input lever 204, which will be described later, is rotated further toward the back side of FIG. 22 (negative side in the X direction) than the position shown in FIG. 22.

The motive power transmission device 200 includes a housing 202, the input lever 204, an input cylinder 206, a main spring 208, a power shaft 210, an output lever 212, a damper 214, and a return spring 216. The motive power transmission device 200 transmits a force for rotating the input lever 204 as a force for rotating the output lever 212. Further, when an excessive force is input in a short time to rotate the input lever 204 at high speed, the motive power transmission device 200 stores a part of the input energy in the main spring 208, attenuates the input force by the damper 214, and outputs the attenuated force to the output lever 212.

For the input lever 204, a roller 220 is pivotably supported at a distal end of an arm portion 218 thereof. When the battery 16 is contained in the containment chamber 14, the bottom portion of the battery 16 comes into contact with the roller 220. Force from the battery 16 is input to the input lever 204 around an input center 220a of the roller 220, and force that rotates the input lever 204 acts on the input lever 204. A base portion of the arm portion 218 is fixed to the input cylinder 206. The input lever 204 and the input cylinder 206 integrally rotate about a pivoting axis parallel to the Y direction. The input cylinder 206 is a member formed in a hollow cylindrical shape having a through-hole passing through the inside thereof in the pivoting axis direction. The input cylinder 206 is pivotably supported by an input member support portion 232 formed in the housing 202. The input lever 204 and the input cylinder 206 correspond to a first member of the present invention, the input lever 204 corresponds to an input portion of the present invention, and the input cylinder 206 corresponds to a first tubular portion of the present invention.

For the output lever 212, a roller 224 is pivotably supported at a distal end of an arm portion 222 thereof. The roller 224 is connected to the connector unit 262, and moves the connector unit 262 to the positive side in the Z direction when the output lever 212 pivots. A root portion of the arm portion 222 is fixed to a pin 230 of the power shaft 210. The output lever 212 and the power shaft 210 integrally pivot on a pivoting axis parallel to the Y direction. The power shaft 210 includes a circular plate portion 226 formed in a circular plate shape, a shaft portion 228 formed to extend from the circular plate portion 226 to the positive side in the Y direction, and the pin 230 formed to extend from the circular plate portion 226 to the negative side in the Y direction. The power shaft 210 is pivotably supported by an output member support portion 234 formed in the housing 202. The output lever 212 and the power shaft 210 correspond to a second member of the present invention, the output lever 212 corresponds to an output portion of the present invention, and the power shaft 210 corresponds to a shaft portion of the present invention.

The input member support portion 232 is formed in a bottomed cylindrical shape in which the negative side in the Y direction is open and the positive side in the Y direction is closed. The output member support portion 234 is formed in a cylindrical shape extending from the bottom surface of the input member support portion 232 to the negative side in the Y direction. The output member support portion 234 is formed so as to penetrate the housing 202, and both the negative side and the positive side in the Y direction are open. The input member support portion 232 and the output member support portion 234 are formed coaxially. That is, the input cylinder 206 supported by the input member support portion 232 and the power shaft 210 supported by the output member support portion 234 are formed coaxially. The housing 202 corresponds to a third member of the present invention, the input member support portion 232 corresponds to a third tubular portion of the present invention, and the output member support portion 234 corresponds to a second tubular portion of the present invention.

The input cylinder 206 is inserted between the inner periphery of the input member support portion 232 and the outer periphery of the output member support portion 234. The input member support portion 232 pivotably supports the input cylinder 206 via an outer bush 236. The negative side in the Y direction of the input cylinder 206 protrudes to the outside of the housing 202, and the input lever 204 is fixed to the portion protruding to the outside. That is, the input lever 204 is disposed on the negative side in the Y direction with respect to the housing 202.

The shaft portion 228 of the power shaft 210 is inserted into the inner periphery of the output member support portion 234, and the output member support portion 234 pivotably supports the power shaft 210 via two inner bushes 238a and 238b. A front end portion of the shaft portion 228 on the positive side in the Y direction protrudes outward from an opening portion of the housing 202 on the positive side in the Y direction. The circular plate portion 226 of the power shaft 210 is located on the negative side in the Y direction with respect to the output member support portion 234 and is housed in the inner periphery of the input cylinder 206. The pin 230 protrudes outward from an opening portion of the housing 202 on the negative side in the Y direction, and the output lever 212 is fixed to the pin 230. That is, the output lever 212 is disposed on the negative side in the Y direction with respect to the housing 202. A thrust bush 240 is provided at an opening of the input cylinder 206 on the negative side in the Y direction. An inner diameter of the thrust bush 240 is smaller than an outer diameter of the circular plate portion 226 of the power shaft 210. The thrust bush 240 restricts movement of the power shaft 210 to the negative side in the Y direction.

The main spring 208 is housed between the inner periphery of the input cylinder 206 and the outer periphery of the output member support portion 234. The main spring 208 is a torsion spring having a circumferential portion 208a in which a wire material is spirally formed, and is disposed coaxially with the input cylinder 206 and the power shaft 210. Since the output member support portion 234 is inserted into the inner periphery of the main spring 208, a tilt of the main spring 208 is restricted. An end portion of the main spring 208 on the positive side in the Y direction is fixed to the input cylinder 206, and an end portion of the main spring 208 on the negative side in the Y direction is fixed to the circular plate portion 226 of the power shaft 210. The main spring 208 has elasticity in a pivoting direction of the input cylinder 206 and the power shaft 210. The force for rotating the input lever 204 is transmitted to the input cylinder 206, the main spring 208, and the power shaft 210 in this order, thereby rotating the output lever 212. That is, the main spring 208 is disposed on a motive power transmission path between the input lever 204 and the input cylinder 206, and the power shaft 210 and the output lever 212. Further, since the main spring 208 connecting the input lever 204 and the input cylinder 206 to the power shaft 210 and the output lever 212 is disposed on the inner peripheral side of the input cylinder 206, the input cylinder 206 and the power shaft 210 can be disposed coaxially, and the input lever 204 and the output lever 212 can be disposed on the same side (negative side in the Y direction). The main spring 208 corresponds to a first elastic member of the present invention, and the circumferential portion 208a corresponds to a first circumferential portion of the present invention.

A return spring housing portion 244 is formed on the outer peripheral side of the input member support portion 232 of the housing 202. The return spring housing portion 244 is formed in a circular groove shape formed coaxially with the input member support portion 232 and the output member support portion 234. The return spring 216 is housed in the return spring housing portion 244. The return spring 216 is a torsion spring having a circumferential portion 216a in which a wire material is spirally formed, and is disposed coaxially with the input cylinder 206 and the power shaft 210. An end portion of the return spring 216 on the positive side in the Y direction is fixed to a bottom portion of the return spring housing portion return spring housing portion 244, and an end portion of the return spring 216 on the negative side in the Y direction is fixed to the arm portion 218 of the input lever 204. The return spring 216 has elasticity in the pivoting direction of the input cylinder 206. The force for pivoting the input lever 204 is transmitted to the housing 202 via the return spring 216. The housing 202 is fixed to the plate 201, and an elastic force acts on the input lever 204 from the return spring 216 in a direction in which pivotal movement of the input lever 204 is prevented. That is, the return spring 216 is disposed on the motive power transmission path between the input lever 204 and the housing 202. The return spring 216 corresponds to a second elastic member of the present invention, and the circumferential portion 216a corresponds to a second circumferential portion of the present invention.

Figure 27:
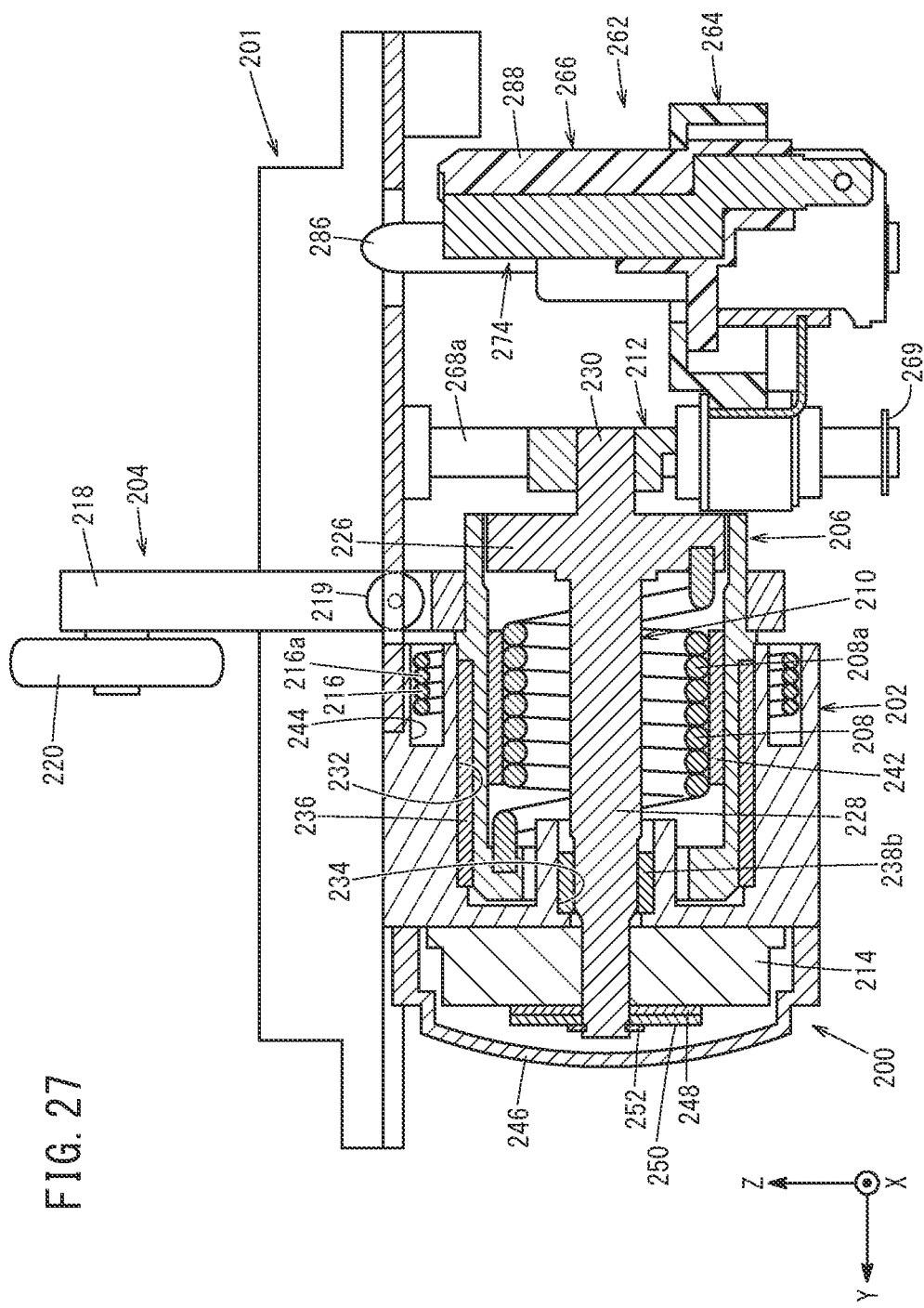
FIG. 27 is a cross-sectional perspective view showing the motive power transmission device according to a modification.

FIG. 27 is a cross-sectional view showing the motive power transmission device. FIG. 27 shows a modification of the motive power transmission device 200 shown in FIG. 26.

In the motive power transmission device 200 shown in FIG. 26, the power shaft 210 is pivotably supported by an output member support portion 234 via the two inner bushes 238a and 238b. In a modified example of the motive power transmission device 200 shown in FIG. 27, a length of the output member support portion 234 in the Y direction is formed to be shorter than a length of the output member support portion 234 in the Y direction shown in FIG. 26, and the power shaft 210 is supported by the output member support portion 234 via one inner bush 238b.

In the modified example of the motive power transmission device 200, the output member support portion 234 is disposed on the inner periphery of the end portion of the main spring 208 on the positive side in the Y direction, but the output member support portion 234 is not disposed on most of the inner periphery of the main spring 208 in the Y direction. Therefore, in the modified example, a cylindrical collar 242 is inserted into the inner periphery of the input member support portion 232, and the main spring 208 is housed in the inner periphery of the collar 242. The collar 242 restricts a tilt of the main spring 208. The collar 242 corresponds to a cylindrical member of the present invention.

As shown in FIGS. 26 and 27, the housing 202, the input cylinder 206, the power shaft 210, the main spring 208, and the return spring 216 are coaxially arranged in a nested manner. In other words, the input cylinder 206 is disposed so as to overlap the power shaft 210 in the pivoting axis direction (Y direction) of the input cylinder 206 and the power shaft 210. In addition, the main spring 208 is disposed so as to overlap the input cylinder 206 and the power shaft 210 in the pivoting axis direction (Y direction) of the input cylinder 206 and the power shaft 210. The return spring 216 is disposed so as to overlap the input cylinder 206 and the housing 202 in the pivoting axis direction (Y direction) of the input cylinder 206 and the power shaft 210. Further, the return spring 216 is disposed so as to overlap the main spring 208 in the pivoting axis direction (Y direction) of the input cylinder 206 and the power shaft 210. In addition, the main spring 208 and the return spring 216 are disposed so as to overlap the input cylinder 206 and the power shaft 210 in the pivoting axis direction (Y direction) of the input cylinder 206 and the power shaft 210. With this configuration, each member of the motive power transmission device 200 is arranged in a compact manner in the pivoting axis direction (Y direction).

The damper 214 is provided on a side surface of the housing 202 on the positive side in the Y direction. The damper 214 is covered by a damper cover 246. The damper 214 includes a stator and a rotor (not shown). The stator is fixed to the housing 202. The shaft portion 228 of the power shaft 210 penetrates the rotor of the damper 214 and is fixed to the rotor by a resin washer 248, a metal washer 250, and a C-shaped retaining ring 252 on the positive side in the Y direction of the rotor. As a result, the power shaft 210 and the rotor of the damper 214 rotate integrally. The stator of the damper 214 is fixed to the housing 202, and the housing 202 is fixed to the plate 201. When the rotor of the damper 214 fixed to the output lever 212 side rotates relative to the stator of the damper 214 fixed to the plate 201 side, a damping force acts from the damper 214 of the output lever 212 in a direction in which pivotal movement is prevented. That is, the damper 214 is disposed on the motive power transmission path between the output lever 212 and the housing 202. The damper 214 used in the present embodiment is of a one-way type, and a damping force acts on the output lever 212 when the output lever 212 pivots from the position shown in FIG. 22 to the front back side (positive side in the Z direction), but a damping force does not act on the output lever 212 when the output lever 212 pivots in the direction of returning to the position shown in FIG. 22. Further, the damper 214 is provided on the positive side in the Y direction of the power shaft 210, and the output lever 212 is provided on the negative side in the Y direction of the power shaft 210. As a result, the damper 214 and the output lever 212 can be disposed so as to be distributed in the pivoting axis direction (Y direction) of the power shaft 210, and the size of the motive power transmission device 200 in the radial direction (direction orthogonal to the Y direction) can be reduced. The damper 214 corresponds to a shock absorbing member of the present invention.

As described above, the input lever 204 and the output lever 212 are disposed on one side (negative side in the Y direction) with respect to the housing 202. That is, in the pivoting axis direction (Y direction), the input lever 204 to which the force is input and the output lever 212 that outputs the force are disposed close to each other. With this configuration, when external force is input to the arm portion 218 of the input lever 204 in the vertical direction (negative side in the Z direction), that is, in a direction orthogonal to the pivoting axis direction, generation of a shear force (couple) in the pivoting axis direction can be reduced. In addition, the damper 214 is disposed on a side of the housing 202 opposite to a side on which the input lever 204 and the output lever 212 are disposed. That is, members through which force is input to and output from the outside of the motive power transmission device 200 may be intensively disposed on one side of the housing 202, and the damper 214 may be disposed on the other side of the housing 202 where the members are not densely disposed.

As shown in FIGS. 22 and 23, the motive power transmission device 200 is attached to a motive power transmission device installation hole 254 formed in the plate 201. A support portion 254a extending toward the inside of the motive power transmission device installation hole 254 is formed in the motive power transmission device installation hole 254. A flange portion 202a extending from the housing 202 of the motive power transmission device 200 is placed on the support portion 254a from above (positive side in the Z direction), and the motive power transmission device 200 is fixed to the plate 201 by a screw or the like (not shown).

In the plate 201, a lever access hole 256 formed continuously with the motive power transmission device installation hole 254. When the input lever 204 rotates from the position shown in FIG. 22 to the back side, the input lever 204 passes through the lever access hole 256 and moves to the negative side in the Z direction of the plate 201. The lever access hole 256 corresponds to a hole portion of the present invention.

As shown in FIG. 24, the arm portion 218 of the input lever 204 is provided so as to extend substantially parallel to a straight line L that passes through the pivoting axis O of the input cylinder 206 and extends in a direction in which force is input from the battery 16 to the input lever 204. The input lever 204 also extends from a position offset with respect to the straight line L. More specifically, when viewed from the positive side in the Y-direction, the arm portion 218 of the input lever 204 extends from a position offset to the left side (negative side in the X-direction) with respect to the straight line L that passes through the pivoting axis O of the input cylinder 206 and extends in a direction in which force is input from the battery 16 to the input lever 204. The arm portion 218 has an extension portion 218a extending substantially parallel to the straight line L and a curved portion 218b curved from the extension portion 218a toward the pivoting axis O. In the input lever 204, the arm portion 218 extends parallel to the Z direction in a state in which the side surface of the arm portion 218 on the positive side in the X direction is in contact with a limit portion 256a at an edge of the lever access hole 256. As a result, the force input from the battery 16 to the input lever 204 on the negative side in the Z direction acts via the input lever 204 as a force biasing toward the negative side in the Z direction at a position separated from the pivoting axis O of the input cylinder 206 in the radial direction, and the input cylinder 206 pivots together with the input lever 204. In addition, when the side surface of the arm portion 218 of the input lever 204 on the positive side in the X direction comes into contact with the limit portion 256a of the lever access hole 256, the arm portion 218 and the limit portion 256a come into surface contact with each other. Thus, it is possible to suppress local forces acting on the arm portion 218 and the lever access hole 256. A plastic pad 219 is attached to a part of the arm portion 218 where the arm portion 218 and the limit portion 256a abut against each other. This makes it possible to suppress noise generated when the arm portion 218 and the lever access hole 256 come into contact with each other. The plastic pad 219 may be attached to the limit portion 256a.

An intrusion prevention part 215 is attached to the arm portion 218 of the input lever 204 on the negative side of the X-direction. As shown in FIG. 23, when the plate 201 is viewed from the positive side in the Z direction, the intrusion prevention part 215 covers a part of the lever access hole 256, and thus it is possible to restrict entry of foreign matter or the like into the lever access hole 256 or in between the lever access hole 256 and the arm portion 218 of the input lever 204. The intrusion prevention part 215 corresponds to a cover portion of the present invention.

Figure 28B:
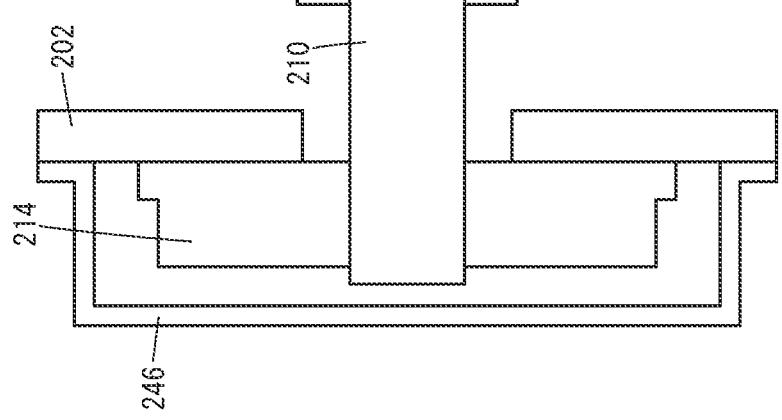
FIGS. 28A and 28B are schematic diagrams of the motive power transmission device.
Figure 28A:
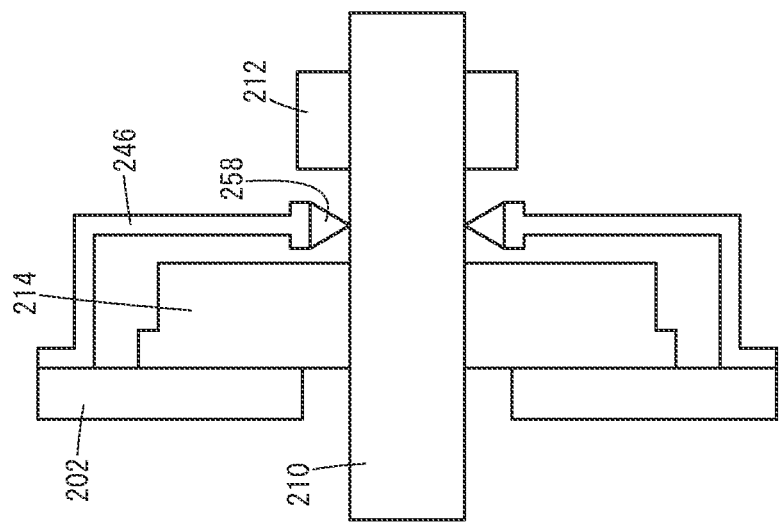

FIGS. 28A and 28B are schematic diagrams of the motive power transmission device. FIGS. 28A and 28B show the housing 202, the power shaft 210, the output lever 212, the damper 214, and the damper cover 246 among the components of the motive power transmission device 200, and other components are omitted. FIG. 28A is a schematic diagram of a comparative example of the motive power transmission device 200 according to the present embodiment, and illustrates a state in which the output lever 212 input lever 204 and the damper 214 are disposed on the same side with respect to the housing 202. As in the present embodiment, FIG. 28B is a schematic diagram of a state in which the output lever 212 and the damper 214 are disposed on opposite sides of the housing 202.

In the comparative example, as shown in FIG. 28A, the power shaft 210 needs to penetrate the damper cover 246. To restrict entry of waste or the like inside the damper cover 246, it is necessary to provide a seal 258 between the damper cover 246 and the power shaft 210, which results in a problem that the structure of the damper cover 246 becomes complicated. In addition, since an operation of inserting the power shaft 210 into the damper cover 246 is performed at the time of assembling the motive power transmission device 200, ease of assembly is reduced. Further, since friction is generated between the power shaft 210 and the seal 258, a part of the energy stored in the main spring 208 is consumed by the friction, and the power transmission efficiency of the motive power transmission device 200 decreases.

On the other hand, in the present embodiment, as shown in FIG. 28B, since the output lever 212 and the damper 214 are disposed on the opposite sides of the housing 202, there is no need to pass the power shaft 210 through the damper cover 246. Therefore, it is possible to simplify the structure of the damper cover 246, improve the ease of assembly of the motive power transmission device 200, and improve the power transmission efficiency of the motive power transmission device 200.

Figure 29A:
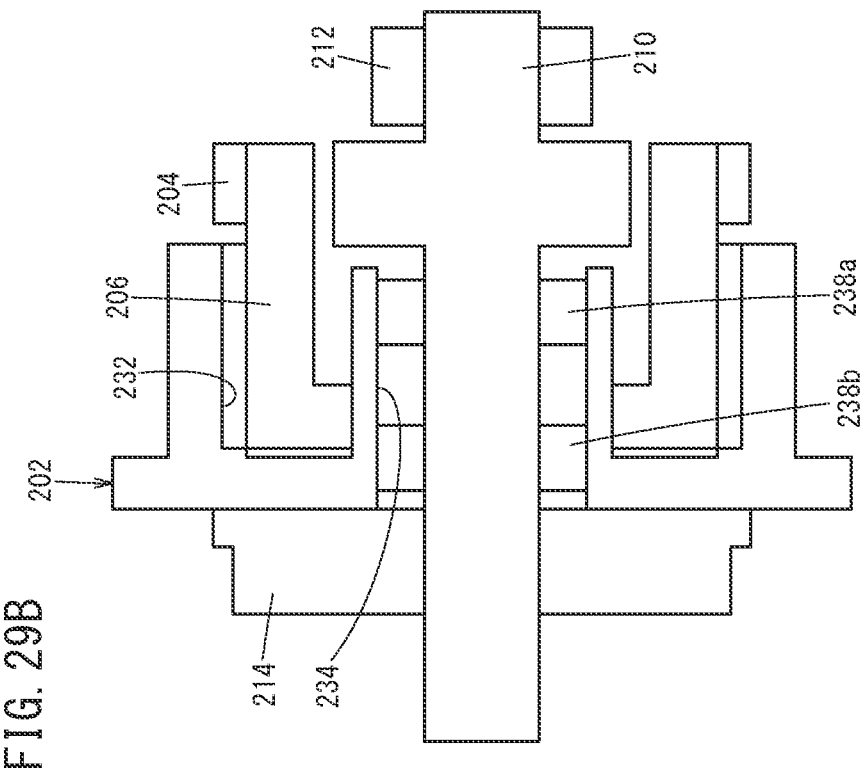
FIGS. 29A and 29B are schematic diagrams of the motive power transmission device.
Figure 29B:
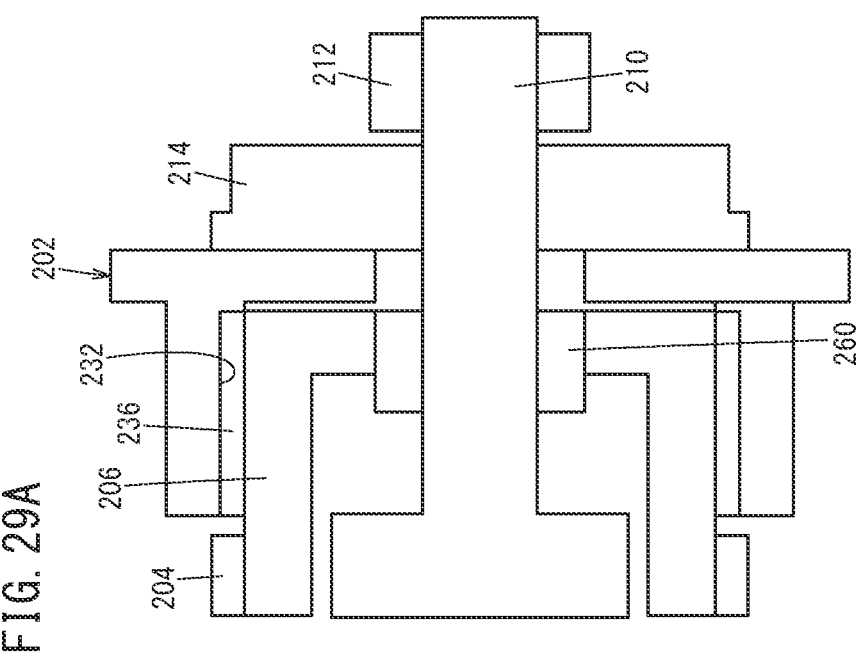

FIGS. 29A and 29B are schematic diagrams of the motive power transmission device. FIGS. 29A and 29B show the housing 202, the input lever 204, the input cylinder 206, the power shaft 210, and the output lever 212 among the components of the motive power transmission device 200, and other components are omitted. FIG. 29A is a schematic diagram of a comparative example of the motive power transmission device 200 according to the present embodiment, and illustrates a state in which the input lever 204 and the output lever 212 are disposed on opposite sides of the housing 202. As in the present embodiment, FIG. 29B is a schematic diagram illustrates a state in which the input lever 204 and the output lever 212 are disposed on the same side with respect to the housing 202.

In the comparative example, as shown in FIG. 29A, one end side of the power shaft 210 is supported by the input cylinder 206 via an inner bush 260. The other end side of the power shaft 210 is supported by a bearing of a rotor (not shown) of the damper 214. Since the input cylinder 206 is supported by the input member support portion 232 of the housing 202 via the outer bush 236, the power shaft 210 is finally supported by the input member support portion 232 of the housing 202. For this reason, the load on each support portion of the power shaft 210 is large, the deflection of the axis of the power shaft 210 is large, and there is a concern that the durability of the motive power transmission device 200 may deteriorate.

On the other hand, in the present embodiment, as shown in the drawing 29B, one end side of the power shaft 210 is supported by the output member support portion 234 of the housing 202 via the inner bushes 238a and 238b. The other end side of the power shaft 210 is supported by a bearing of a rotor (not shown) of the damper 214. That is, since the power shaft 210 is supported by the output member support portion 234 of the housing 202 via the two inner bushes 238a and 238b, the load on each support portion of the power shaft 210 can be reduced, the axial deflection of the power shaft 210 is reduced, and the durability of the motive power transmission device 200 can be improved.

FIGS. 30A to 30D show dynamic equivalent models of the motive power transmission device. FIGS. 30A to 30D are diagrams modeling the housing 202, the input lever 204 (input cylinder 206), the output lever 212 (power shaft 210), the main spring 208, the return spring 216, and the damper 214.

Figure 30A:
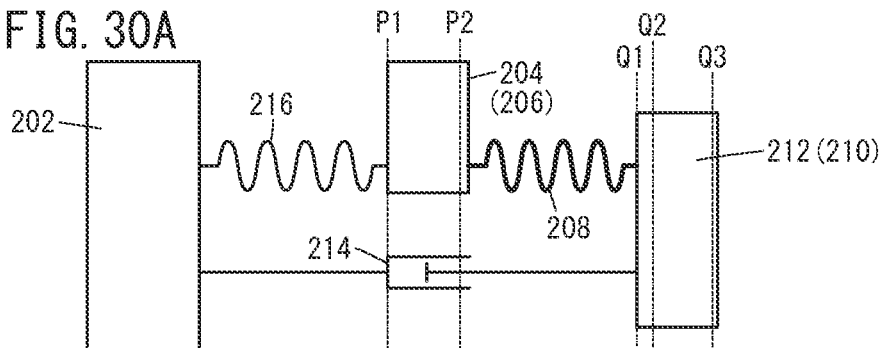
FIGS. 30A, 30B, 30C and 30D are dynamic equivalent models of the motive power transmission device.

FIG. 30A shows an initial state of the motive power transmission device 200. The initial state refers to a state in which the input lever 204 is placed at the position shown in FIG. 22. In an initial state, in the input lever 204, a side surface of the arm portion 218 on the positive side in the X direction is in contact with an edge of the lever access hole 256. In FIGS. 30A to 30D, the position of the input lever 204 in the initial state is indicated by P1, and the position of the output lever 212 is indicated by Q1. In the initial state, a preload is applied to the main spring 208 and the return spring 216. There is a region for play on the main spring 208 and the return spring 216, from their natural length states until they are deformed and elastic force is generated. For example, when no preload acts on the return spring 216, the input lever 204 has a backlash and its position is not fixed. In the initial state, the input lever 204 can be positioned by preloading the main spring 208 and the return spring 216.

Figure 30B:
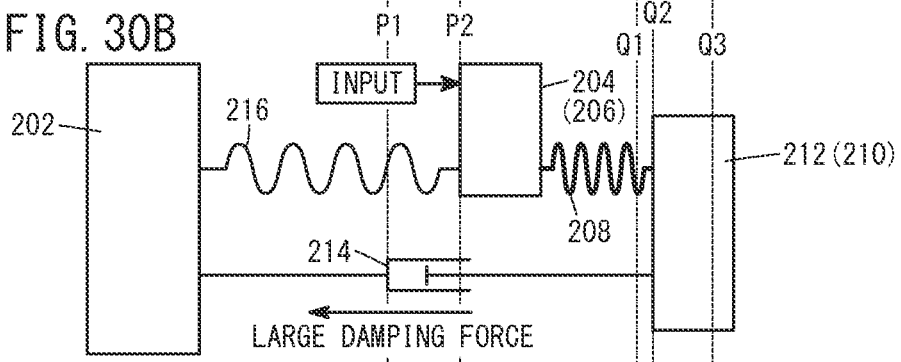

FIG. 30B shows a state of the motive power transmission device 200 immediately after force has been input from outside to tilt the input lever 204. In FIGS. 30A to 30D, the side on which the input lever 204 is tilted is shown as the right side. When a force is input to the input lever 204, the input lever 204 moves to the right side. At this time, the return spring 216 is deformed, and energy is stored in the return spring 216. Since the force input to the input lever 204 is transmitted to the output lever 212 via the main spring 208, the output lever 212 also moves to the right side as the input lever 204 moves. In FIGS. 30A to 30D, the position of the input lever 204 immediately after force has been input to the input lever 204 is indicated by P2, and the position of the output lever 212 is indicated by Q2.

The damper 214 provided between the output lever 212 and the housing 202 generates a larger damping force in a direction in which the movement of the output lever 212 is prevented, as the temporal change of the force input to the output lever 212 is larger. Therefore, immediately after the force starts to be transmitted from the main spring 208 to the output lever 212, the amount of movement of the output lever 212 is smaller than the amount of movement of the input lever 204, the main spring 208 deforms, and energy is stored in the main spring 208. Since energy is stored in the main spring 208, a force input to the input lever 204 does not directly act on the damper 214, and an impact input to the damper 214 can be reduced.

Figure 30C:
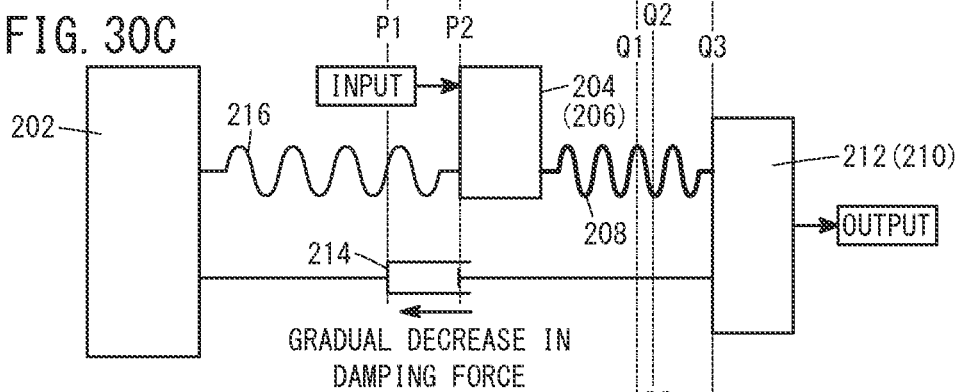

FIG. 30C shows the state of the motive power transmission device 200 after a lapse of time from the input of force from the outside to tilt the input lever 204. When time elapses after the force is input to the input lever 204, the damping force of the damper 214 gradually decreases and the elastic force of the main spring 208 increases, so that the energy stored in the main spring 208 is released and the output lever 212 moves to the right side at a low speed. In FIGS. 30A to 30D, the position of the input lever 204 is indicated in P2 and the position of the output lever 212 is indicated in Q3, after a lapse of time from the input of force to the input lever 204.

That is, even if a large force acts on the input lever 204 in a short time, the motive power transmission device 200 attenuates the input force and outputs the attenuated force from the output lever 212. As a result, the connector unit 262 connected to the output lever 212 moves upward (the positive side in the Z direction) at a low speed together with the output lever 212, and the impact at the time of fitting of the casing-side connection terminal 274 and the battery-side connection terminal 272 can be reduced.

Figure 30D:
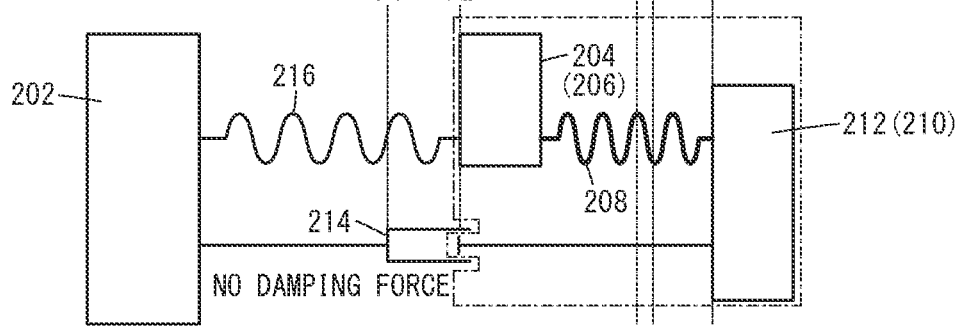

FIG. 30D shows the state of the motive power transmission device 200 when there is no external force input to the input lever 204. When no force is input to the input lever 204, the input lever 204, the main spring 208, and the output lever 212 move integrally to their initial positions by the restoring force of the return spring 216. Since the damper 214 is a one-way type, the damper 214 does not generate a damping force when the output lever 212 returns to the position in the initial state.

The displacements of the respective members shown in the order of FIG. 30A, FIG. 30B, FIG. 30C, and FIG. 30D (FIG. 30A→FIG. 30B→FIG. 30C→FIG. 30D) are those in the case where the speed at which the input lever 204 is displaced is slightly high. When the speed at which the input lever 204 is displaced is low, the damper 214 generates little damping force and the main spring 208 is not deformed, so that the members are displaced in the order of FIG. 30A, FIG. 30C, and FIG. 30D (FIG. 30A→FIG. 30C→FIG. 30D). On the other hand, when the speed at which the input lever 204 is displaced is high, the damper 214 generates a large damping force. Therefore, in the state shown in FIG. 30B, the output lever 212 hardly moves and shifts to the state shown in FIG. 30C.

The spring constant of the return spring 216 may be set to a value such that the motive power transmission device 200 can be returned to the initial state when no force is input from outside to the input lever 204. Therefore, it is set to be as small as possible relative to the spring constant of the main spring 208.

As shown in FIGS. 22, 23, and 25 to 27, the connector unit 262 includes a connector holder 264 and the connector 266. The connector 266 supports the casing-side connection terminal 274. The connector holder 264 is supported by the two poles 268a and 268b extending from the plate 201 to the negative side in the Z direction so as to be movable in the vertical direction (Z direction). The poles 268a and 268b are arranged asymmetrically with respect to the center of the connector holder 264 when the connector holder 264 is viewed from above (the positive side in the Z direction). A C-shaped retaining ring 269 is provided at an end of each of the poles 268a and 268b on the negative side in the Z direction. The connector holder 264 is prevented from coming off from the pole 268a and 268b by the C-shaped retaining ring 269. An elongate hole 270 extending in the X direction is formed in a side surface of the connector holder 264 facing the motive power transmission device 200. The roller 224 of the output lever 212 is inserted into the elongate hole 270.

Figure 31:
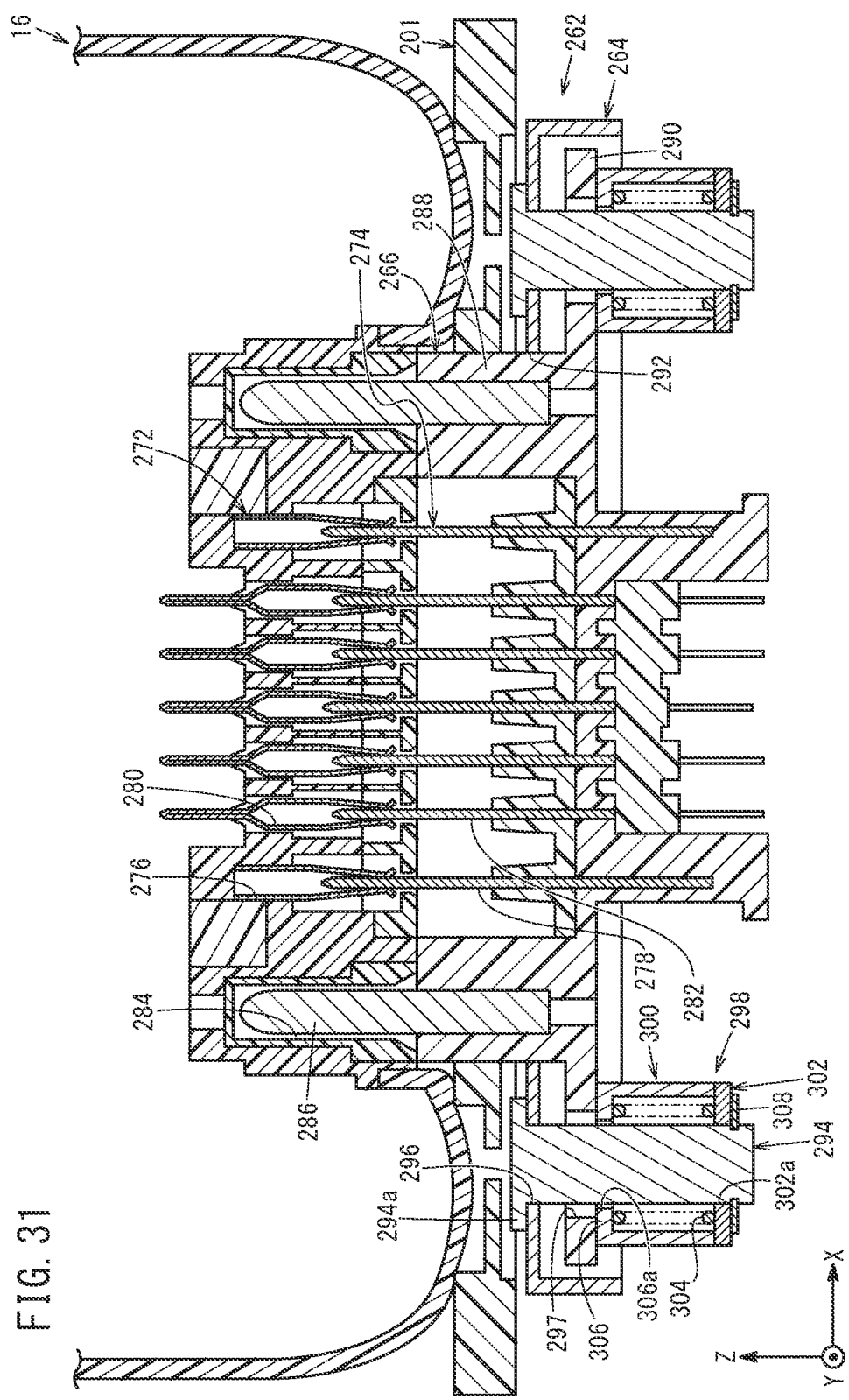
FIG. 31 is a cross-sectional view of a connector unit.

FIG. 31 is a cross-sectional view of the connector unit. FIG. 31 shows a state in which the battery-side connection terminal 272 provided on the bottom surface of the battery 16 are connected to the casing-side connection terminal 274.

The casing-side connection terminal 274 includes a pair of high-voltage terminal pins 278 that can be fitted and connected to high-voltage terminals 276 of the battery-side connection terminal 272, and a plurality of signal terminal pins 282 that can be fitted and connected to signal terminals 280 of the battery-side connection terminal 272. The high-voltage terminal pins 278 and the signal terminal pins 282 are provided so as to extend toward the battery 16 side (positive side in the Z direction). The high-voltage terminal pins 278 and the signal terminal pins 282 are arranged in a line in the X direction. The high-voltage terminal pins 278 are respectively disposed outside the signal terminal pins 282. The distal ends of the high-voltage terminal pins 278 are located closer to the battery 16 (positive side in the Z direction) than the distal ends of the signal terminal pins 282 are. Therefore, when the casing-side connection terminal 274 is connected to the battery-side connection terminal 272, the high-voltage terminal pins 278 are connected to the battery-side connection terminal 272 before the signal terminal pins 282 are connected.

The connector 266 has guide protrusions 286 that can be fitted and connected to guide holes 284 formed in the bottom surface of the battery 16. The guide protrusions 286 are provided in pairs on both outer sides in the X direction of the casing-side connection terminal 274. The guide protrusions 286 are provided to extend toward the battery 16 side (the positive side in the Z direction). Each of the guide protrusions 286 is formed in a substantially cylindrical shape as a whole, and a distal end portion thereof is provided with a spherical or tapered surface. The distal ends of the guide protrusions 286 are located closer to the battery 16 (positive side in the Z direction) than the high-voltage terminal pins 278 and the signal terminal pins 282 are. Therefore, when the casing-side connection terminal 274 is connected to the battery-side connection terminal 272, the guide protrusions 286 are connected to the guide holes 284 before the high-voltage terminal pins 278 and the signal terminal pins 282 are connected to the battery-side connection terminal 272.

The connector 266 includes a terminal holding portion 288 on which the casing-side connection terminal 274 is provided, and a flange portion 290 extending to the outer peripheral side of the terminal holding portion 288. The terminal holding portion 288 is inserted into a through hole 292 of the connector holder 264, and is prevented from being detached from the connector holder 264 by the flange portion 290. The connector 266 is supported by the connector holder 264 via a pair of coupling pins 294 so as to be relatively movable in the vertical direction (Z direction). The coupling pins 294 are inserted into through holes 296 formed in the connector holder 264 and through holes 297 formed in the flange portion 290 of the connector holder 264. A head portion 294a of an upper portion (end portion on the positive side in the Z-direction) of the coupling pin 294 is formed to have a larger diameter than the through hole 296 of the connector holder 264, and the coupling pin 294 is prevented from coming off from the connector holder 264 by the head portion 294a.

The coupling pin 294 is provided with a spring unit 298 that biases the flange portion 290 of the connector 266 toward the battery 16 side (positive side in the Z direction). The spring unit 298 includes a case 300, a stopper plate 302, and a coil spring 304. The case 300 is formed in a bottomed cylindrical shape, and a through hole 306a into which the coupling pin 294 is inserted is formed in a bottom portion 306. The stopper plate 302 is a circular plate-shaped member whose outer dimension is substantially the same as the outer dimension of the case 300, and the coupling pin 294 is inserted into a through-hole 302a at the central portion of the stopper plate 302. The stopper plate 302 is retained with respect to the coupling pin 294 by a C-shaped retaining ring 308. The coil spring 304 is provided between the case 300 and the stopper plate 302, with the coupling pin 294 inserted into the inner periphery thereof.

With such a configuration, the connector holder 264 and the connector 266 integrally move upward (positive side in the Z direction) until the fitting of the casing-side connection terminal 274 and the battery-side connection terminal 272 is completed. When the fitting of the casing-side connection terminal 274 and the battery-side connection terminal 272 is completed and the side surface of the terminal holding portion 288 on the battery 16 side comes into contact with the bottom surface of the battery 16, the movement of the connector 266 is limited, and as shown in FIG. 31, the connector 266 moves downward (negative side in the Z direction) relative to the connector holder 264.

FIGS. 32A to 32E are dynamic equivalent models of the connector unit. FIGS. 32A to 32E are diagrams in which the battery-side connection terminal 272, the casing-side connection terminal 274, the coil spring 304, the connector 266, and the connector holder 264 are modeled.

FIG. 32A shows a state of the connector unit 262 before the casing-side connection terminal 274 and the battery-side connection terminal 272 are fitted to each other. An upward (positive side in the Z direction) force is input to the connector holder 264 from the output lever 212 of the motive power transmission device 200. The force input to the connector holder 264 is transmitted to the connector 266 via the coil spring 304, and the connector holder 264 and the connector 266 integrally move upward.

FIG. 32B shows a state of the connector unit 262 during fitting of the casing-side connection terminal 274 and the battery-side connection terminal 272. During the fitting, the casing-side connection terminal 274, the connector 266, and the connector holder 264 integrally move upward.

FIG. 32C shows a state of the connector unit 262 at the completion of fitting of the casing-side connection terminal 274 and the battery-side connection terminal 272. Until the fitting is completed, the casing-side connection terminal 274, the connector 266, and the connector holder 264 integrally move upward.

FIG. 32D shows a state of the connector unit 262 during pre-compression of the coil spring 304 after completion of fitting of the casing-side connection terminal 274 and the battery-side connection terminal 272. During the pre-compression, the casing-side connection terminal 274 and the connector 266 do not move, and the connector holder 264 moves upward. As a result, the coil spring 304 is compressed, and the load pressing the casing-side connection terminal 274 toward the battery-side connection terminal 272 increases.

FIG. 32E shows a state of the connector unit 262 when the pre-compression of the coil spring 304 is completed. The connector holder 264 stops at a position where the pre-compression of the coil spring 304 is completed. At this time, the casing-side connection terminal 274 comes to a state in which the casing-side connection terminal 274 is pressed toward the battery-side connection terminal 272 with a sufficient force. Thus, even if the battery 16 slightly moves upward (positive side in the Z direction) in the containment chamber 14, the connector 266 follows the movement of the battery 16, so that the fitting of the casing-side connection terminal 274 and the battery-side connection terminal 272 is not disengaged.

Assuming that the pressing force of the coil spring 304 to the casing-side connection terminal 274 by the coil spring is indicated as F1 in the initial state, F2 during fitting of the casing-side connection terminal 274 and the battery-side connection terminal 272, F3 at the completion of the fitting, F4 during pre-compression of the coil spring 304, and F5 at the completion of pre-compression, these have the relationship: $F1<F2 \approx F3<F4<F5$.

The above describes a preferred embodiment of the present invention, but the present invention is not limited to the above-described embodiment, and various modifications could be adopted therein without departing from the essence and gist of the present invention.

For example, in the above embodiment, an example is described of a case in which the ventilation paths 36A, 36C, 36D, and 36F are intake paths and the ventilation path 36E is an exhaust path, but the present invention is not limited to this. For example, the ventilation paths 36A, 36C, 36D, and 36F may be exhaust paths and the ventilation path 36E may be an intake path. In this case, the blower 52 sends air from the left side to the right side in FIGS. 12A and 12B.

In the above-described embodiment, an example is described of a case in which the charging power supply device 10 is capable of charging the battery 16 and supplying electric power stored in the battery 16 to an external device, but the present invention is not limited to this. For example, the charging power supply device 10 may charge the battery 16 but need not necessarily be capable of outputting the power stored in the battery 16 to an external device. Further, the charging power supply device 10 may be capable of supplying power stored in the battery 16 to an external device, but need not necessarily be capable of charging the battery 16. That is, the charging power supply device 10 can mean not only a device capable of performing both charging and supplying power but also a device capable of performing only charging or a device capable of performing only supplying power.

Further, in the above-described embodiment, an example is described of a case in which the casing 12 is applied to the charging power supply device 10, but the present invention is not limited to this. The casing 12 can be applied to any device other than the charging power supply device 10. For example, the casing 12 may be applied to a personal computer or the like.

In addition, in the above-described embodiment, the input lever 204, the input member of the input cylinder 206, the output lever 212, and the output member of the power shaft 210 perform pivotal movement, but the input member and the output member may be configured to perform translational movement.

Further, in the above-described embodiment, torsion springs are used as the main spring 208 and the return spring 216. However, other springs such as coil springs may be used in a case where the input member and the output member perform translational movement.

Further, in the above-described embodiment, the motive power transmission device 200 is used as a device that transmits a force acting on the motive power transmission device 200 from the battery 16 to the connector unit 262 and that moves the connector unit 262 toward the battery 16 side. In contrast, the motive power transmission device 200 may be used as a shock absorber that absorbs a shock when the battery 16 is contained in the containment chamber 14. When the motive power transmission device 200 is used as a shock absorber, the motive power transmission device 200 need not necessarily have a function of moving the connector unit 262 toward the battery 16 side. In this case, the connector unit 262 may be fixed to the positive side of the plate 201 in the Z direction. Alternatively, a device for moving the connector unit 262 to the battery 16 side may be separately provided. When the motive power transmission device 200 is used as a shock absorber, the motive power transmission device 200 may have a structure that includes the input lever 204, the input cylinder 206, the main spring 208, and the return spring 216, but does not include the power shaft 210, the output lever 212, or the damper 214.

The following is a summary of the embodiments described above.

The motive power transmission device includes the first member, the second member, and the third member that are movable relatively to each other and mechanically connected so as to transmit motive power to each other, and the motive power transmission device includes the first elastic member disposed on a first motive power transmission path that is a motive power transmission path between the first member and the second member, the second elastic member disposed on a second motive power transmission path that is a motive power transmission path between the first member and the third member, and the buffer member disposed on a third motive power transmission path that is a motive power transmission path between the second member and the third member. According to such a configuration, transmission of excessive external force can be suppressed.

Each of the first member and the second member may be provided pivotably. According to such a configuration, the motive power transmission device can be made compact.

The pivoting axis of the first member and the pivoting axis of the second member may be disposed on the same straight line. According to such a configuration, the motive power transmission device can be made compact.

The first elastic member may have elasticity in a pivoting direction of the first member and a pivoting direction of the second member, and may be disposed on the same straight line as the pivoting axis of the first member and the pivoting axis of the second member. According to such a configuration, the motive power transmission device can be made compact.

The first elastic member may be disposed so as to overlap with the first member and the second member in the direction of the pivoting axis of the first member and the direction of the pivoting axis of the second member. According to such a configuration, the motive power transmission device can be made compact.

REFERENCE SIGNS LIST

200: motive power transmission device
202: housing
204: input lever
208: main spring
212: output lever
214: damper
216: return spring

What is claim is:

1. An electric power device including a motive power transmission device having a first member, a second member, and a third member that are movable relatively to each other and mechanically connected so as to transmit motive power to each other, the electric power device comprising:
    a first elastic member disposed on a first motive power transmission path that is a motive power transmission path between the first member and the second member;
    a second elastic member disposed on a second motive power transmission path that is a motive power transmission path between the first member and the third member; and
    a buffer member disposed on a third motive power transmission path that is a motive power transmission path between the second member and the third member,
    wherein the first member includes an input portion to which a force is input from an electric energy storage device that is attachable to and detachable from the electric power device, and
    the second member includes an output portion configured to output a force to a terminal of the electric power device that is connected to a terminal of the electric energy storage device.

2. A motive power transmission device including a first member, a second member, and a third member that are movable relatively to each other and mechanically connected so as to transmit motive power to each other, the motive power transmission device comprising:
    a first elastic member disposed on a first motive power transmission path that is a motive power transmission path between the first member and the second member;

a second elastic member disposed on a second motive power transmission path that is a motive power transmission path between the first member and the third member; and a buffer member disposed on a third motive power transmission path that is a motive power transmission path between the second member and the third member, wherein the first member includes an input portion to which a force is input from outside of the motive power transmission device, and the second member includes an output portion configured to output a force to the outside of the motive power transmission device.

3. The motive power transmission device according to claim 2, wherein a pivoting axis of the first member and a pivoting axis of the second member are disposed on a same axis, the second member includes a shaft portion extending in a direction of the axis, the output portion is connected to one side of the shaft portion, and the buffer member is connected to another side of the shaft portion.

4. The motive power transmission device according to claim 3, wherein the input portion is disposed on the one side of the shaft portion.

5. The motive power transmission device according to claim 2, wherein a pivoting axis of the first member and a pivoting axis of the second member are disposed on a same axis, and when viewed in a direction of the axis, a pivoting center of the first member and the input portion are disposed so as to be offset from each other in a direction in which a force is input to the input portion.

6. The motive power transmission device according to claim 5, wherein the input portion includes an extension portion extending along the direction in which the force is input to the input portion, and a curved portion curved from the extension portion toward the pivoting center of the first member.

7. The motive power transmission device according to claim 6, comprising a limit portion configured to limit pivotal movement of the first member in one direction, wherein the second elastic member is disposed so as to bias the first member in the one direction, and the input portion is disposed in a manner that the extension portion and the limit portion are in contact with each other.

8. The motive power transmission device according to claim 7, wherein the limit portion is provided in a hole portion through which the first member is pivotably inserted, and the first member includes a cover portion configured to cover at least a part of the hole portion.

9. The motive power transmission device according to claim 7, wherein when the second member is pivoted in the one direction, a damping force does not act on the second member from the buffer member, and when the second member is pivoted in another direction, a damping force acts on the second member from the buffer member.

10. The motive power transmission device according to claim 2, wherein the motive power transmission device is disposed in an electric power device, and the input portion is disposed in a manner that the force is input from an electric energy storage device which is attachable to and detachable from the electric power device, and the output portion is disposed in a manner that the force is output to a terminal of the electric power device which is connected to a terminal of the electric energy storage device.

11. A motive power transmission device including a first member, a second member, and a third member that are movable relatively to each other and mechanically connected so as to transmit motive power to each other, the motive power transmission device comprising:

a first elastic member disposed on a first motive power transmission path that is a motive power transmission path between the first member and the second member;

a second elastic member disposed on a second motive power transmission path that is a motive power transmission path between the first member and the third member; and a buffer member disposed on a third motive power transmission path that is a motive power transmission path between the second member and the third member, wherein each of the first member and the second member is provided pivotably, a pivoting axis of the first member and a pivoting axis of the second member are disposed on a same axis, and the second elastic member has elasticity in a pivoting direction of the first member and a pivoting direction of the third member, and includes a second circumferential portion formed in a circumferential shape around the axis.

12. The motive power transmission device according to claim 11, wherein the first elastic member has elasticity in a pivoting direction of the first member and a pivoting direction of the second member, and includes a first circumferential portion formed in a circumferential shape around the axis.

13. The motive power transmission device according to claim 12, wherein the first elastic member is disposed so as to overlap with the first member and the second member in a direction of the axis.

14. The motive power transmission device according to claim 12, comprising a cylindrical member disposed radially outside the first circumferential portion.

15. The motive power transmission device according to claim 11, wherein the second elastic member is disposed so as to overlap with the first elastic member in a direction of the axis.

16. The motive power transmission device according to claim 11, wherein the first member includes a first tubular portion that is formed in a hollow shape and extends in a direction of the axis.

17. The motive power transmission device according to claim 16, wherein the first elastic member is disposed in a manner that at least a part of the first elastic member is housed inside the first tubular portion.

18. The motive power transmission device according to claim 12, wherein the third member includes a second tubular portion that is formed in a hollow shape and extends in a direction of the axis, and the second tubular portion is inserted and disposed radially inside the first circumferential portion.

19. The motive power transmission device according to claim 11, wherein each of the first elastic member and the second elastic member is a torsion spring.

20. The motive power transmission device according to claim 12, wherein the second member includes a shaft portion extending in a direction of the axis, and the shaft portion is inserted and disposed in the first circumferential portion.

21. The motive power transmission device according to claim 16, wherein the third member includes a third tubular portion that is formed in a hollow shape and extends in the direction of the axis, and the first tubular portion is inserted in the third tubular portion and supported by the third tubular portion so as to be pivotable on the axis.

\* \* \* \* \*